United States Patent
Dugas et al.

(10) Patent No.: US 12,433,191 B2
(45) Date of Patent: Oct. 7, 2025

(54) AGRICULTURAL HARVESTING MACHINE CUTTER HEIGHT CONTROL

(71) Applicant: Deere & Company, Moline, IL (US)

(72) Inventors: Bryan E. Dugas, Thibodaux, LA (US); Mark S. Louviere, Houma, LA (US); John A. Dighton, Napoleonville, LA (US)

(73) Assignee: DEERE & COMPANY, Moline, IL (US)

( * ) Notice: Subject to any disclaimer, the term of this patent is extended or adjusted under 35 U.S.C. 154(b) by 870 days.

(21) Appl. No.: 17/682,419

(22) Filed: Feb. 28, 2022

(65) Prior Publication Data

US 2023/0270043 A1    Aug. 31, 2023

(51) Int. Cl.
*A01D 34/00* (2006.01)
*A01D 41/14* (2006.01)
*A01D 45/10* (2006.01)
*G01C 21/00* (2006.01)

(52) U.S. Cl.
CPC .......... *A01D 34/006* (2013.01); *A01D 45/10* (2013.01); *A01D 41/141* (2013.01); *G01C 21/3826* (2020.08); *G01C 21/3833* (2020.08)

(58) Field of Classification Search
CPC .... A01D 34/006; A01D 45/10; A01D 41/141; A01D 41/127; G01C 21/3826; G01C 21/3833
See application file for complete search history.

(56) References Cited

U.S. PATENT DOCUMENTS

| | | | |
|---|---|---|---|
| 7,401,455 | B1 | 7/2008 | Cleodolphi |
| 8,452,501 | B1 | 5/2013 | Lange et al. |
| 9,585,309 | B2 | 3/2017 | Posselius et al. |
| 2013/0116894 | A1* | 5/2013 | Perez-Iturbe ......... A01D 45/10 701/50 |
| 2017/0013777 | A1* | 1/2017 | Posselius ............. A01D 41/141 |
| 2018/0070531 | A1* | 3/2018 | Long ................. A01D 34/006 |
| 2020/0221635 | A1 | 7/2020 | Hendrickson et al. |

(Continued)

FOREIGN PATENT DOCUMENTS

DE    2654141 A1    6/1978
WO    WO-2021261343 A1 *  12/2021

OTHER PUBLICATIONS

Machine Translation of WO2021261343 A1 (Year: 2021).*

(Continued)

*Primary Examiner* — Brandon D Lee
(74) *Attorney, Agent, or Firm* — Christopher J. Volkmann; Kelly, Holt & Christenson P.L.L.C.

(57) ABSTRACT

A method of controlling an agricultural harvesting machine having a harvesting device configured to engage and cut crop on a field. The method includes receiving an indication of field topography in a first area of the field prior to the first area being harvested, controlling a position of the harvesting device to harvest the crop in the first area based on the indication of field topography in the first area, receiving in-situ data from the first area of the field after the first area is harvested by the harvesting device, receiving an indication of field topography in a second area of the field prior to the second area being harvested, and controlling the position of the harvesting device to harvest the crop in the second area based on the in-situ data and the indication of field topography in the second area.

20 Claims, 18 Drawing Sheets

(56) References Cited

U.S. PATENT DOCUMENTS

| | | | |
|---|---|---|---|
| 2020/0325652 A1* | 10/2020 | Veasy | E02F 3/7654 |
| 2021/0029878 A1* | 2/2021 | Vandike | A01F 15/0715 |
| 2021/0289707 A1* | 9/2021 | Schloesser | A01D 47/00 |
| 2023/0062392 A1* | 3/2023 | Brokaw | A01D 41/141 |

OTHER PUBLICATIONS

Precision Agriculture. Case Study [online]. SensorLogic, 2024 [retrieved on Feb. 27, 2024]. Retrieved from the internet: https://www.sensorlogic.ai/precision-agriculture/, 3 pages.

* cited by examiner

AGRICULTURAL HARVESTING MACHINE CUTTER HEIGHT CONTROL

FIELD OF THE DESCRIPTION

The present description generally relates to agricultural harvesting machines. More specifically, but not by limitation, the present description relates to cutter height control for an agricultural harvesting machine.

BACKGROUND

There are many different types of agricultural machines. Some machines include harvesters, such as combine harvesters, sugarcane harvesters, forage harvesters, etc. Controlling these types of harvesters is often quite complicated. An operator may provide a wide variety of different types of inputs to control a variety of different types of subsystems on the harvester. Also, some or all control of various subsystems can be automated or semi-automated. One example control is cutter height which defines the height at which the crop is cut relative to the ground.

The discussion above is merely provided for general background information and is not intended to be used as an aid in determining the scope of the claimed subject matter.

SUMMARY

A method of controlling an agricultural harvesting machine having a harvesting device configured to engage and cut crop on a field. The method includes receiving an indication of field topography in a first area of the field prior to the first area being harvested, controlling a position of the harvesting device to harvest the crop in the first area based on the indication of field topography in the first area, receiving in-situ data from the first area of the field after the first area is harvested by the harvesting device, receiving an indication of field topography in a second area of the field prior to the second area being harvested, and controlling the position of the harvesting device to harvest the crop in the second area based on the in-situ data and the indication of field topography in the second area.

Example 1 is a method of controlling an agricultural harvesting machine having a harvesting device configured to engage and cut crop on a field, the method comprising:
  receiving an indication of field topography in a first area of the field prior to the first area being harvested;
  controlling a position of the harvesting device to harvest the crop in the first area based on the indication of field topography in the first area;
  receiving in-situ data from the first area of the field after the first area is harvested by the harvesting device;
  receiving an indication of field topography in a second area of the field prior to the second area being harvested; and
  controlling the position of the harvesting device to harvest the crop in the second area based on the in-situ data and the indication of field topography in the second area.

Example 2 is the method of any or all previous examples, wherein the harvesting device comprises a front-end assembly having a cutting device, and further comprising:
  determining a height of a crop bed in the first area based on the first indication of field topography; and
  setting a cutting height of the cutting device based on the height of the crop bed.

Example 3 is the method of any or all previous examples, wherein receiving the indication of field topography in the first area comprises:
  receiving, from a first sensor on the agricultural harvesting machine, a first sensor signal indicative of a distance from the first sensor to the crop bed.

Example 4 is the method of any or all previous examples, wherein receiving in-situ data comprises receiving a second sensor signal from a second sensor on the agricultural harvesting machine.

Example 5 is the method of any or all previous examples, wherein each of the first and second sensors comprises at least one of:
  a radio detection and ranging (RADAR) sensor;
  an ultrasonic sensor; or
  an imaging sensor.

Example 6 is the method of any or all previous examples, wherein the second sensor signal is indicative of crop stubble height in the first area, and the method further comprises:
  determining that the crop stubble height is above a threshold; and
  adjusting a height of the cutting device based on the determination.

Example 7 is the method of any or all previous examples, wherein the second sensor signal is indicative of a distance from the second sensor to the crop bed.

Example 8 is the method of any or all previous examples, and further comprising:
  determining that the front-end assembly contacted a ground surface in the first area based on the first and second sensor signals; and
  controlling the position based on the determination.

Example 9 is the method of any or all previous examples, and further comprising: adjusting a height of the cutting device based on the second sensor signal.

Example 10 is the method of any or all previous examples, and further comprising:
  calibrating the first sensor based on the second sensor signal.

Example 11 is the method of any or all previous examples, wherein
  the first area of the field comprises a first crop row of a plurality of crop rows in the field,
  the second area of the field comprises a second crop row, of the plurality of crop rows, that is adjacent to the first crop row, and
  the method further comprises:
    generating, based on the in-situ data, a predicted crop bed height in the second crop row; and
    controlling the position of the harvesting device to harvest the crop in the second crop row based on the predicted crop bed height and the indication of field topography in the second crop row.

Example 12 is the method of any or all previous examples,
  detecting furrow depth between first and second crop rows based on the field topography; and
  based on the detected furrow depth, controlling height of a crop collecting and gathering device of the agricultural harvesting machine.

Example 13 is the method of any or all previous examples, and further comprising:
  detecting a first depth of a furrow between a first crop row and a second crop row prior to the first crop row being harvested by the agricultural harvesting machine;

detecting a second depth of the furrow after the first crop row is harvested by the agricultural harvesting machine;

generating a compaction factor based on the first and second depths; and controlling the agricultural harvesting machine based on the compaction factor.

Example 14 is an agricultural harvesting machine comprising:

a set of ground engaging traction elements;

a propulsion subsystem configured to drive one or more of the ground engaging traction elements over a field;

a harvesting device configured to engage and cut crop on the field; and a control system configured to:
  receive an indication of field topography in a first area prior to the first area being harvested by the harvesting device;
  control a position of the harvesting device to harvest the crop in the first area based on the indication of field topography in the first area;
  receive in-situ data from the first area of the field after the first area is harvested by the harvesting device;
  receive an indication of field topography in a second area prior to the second area being harvested by the harvesting device; and
  control the position of the harvesting device to harvest the crop in the second area based on the in-situ data and the indication of field topography in the second area.

Example 15 is the agricultural harvesting machine of any or all previous examples, wherein the harvesting device comprises a front-end assembly having a cutting device, and the control system is configured to:
  determine a height of a crop bed in the second area based on the in-situ data and the indication of field topography in the second area; and
  set a cutting height of the cutting device based on the height of the crop bed.

Example 16 is the agricultural harvesting machine of any or all previous examples, and further comprising:
  a first sensor configured to generate the indication of field topography in the first area, the indication representing a height of a crop bed in the first area prior to the crop bed being harvested by the harvesting device; and
  a second sensor configured to generate the in-situ data representing the crop bed after the crop bed is harvested by the harvesting device.

Example 17 is the agricultural harvesting machine of any or all previous examples, wherein the in-situ data is indicative of crop stubble height in the first area, and the control system is configured to:
  determine that the crop stubble height is above a threshold;
  adjust a height of the cutting device based on the determination; calibrate the first sensor; and
  receive the indication of field topography in the second area from the calibrated first sensor.

Example 18 is the agricultural harvesting machine of any or all previous examples, wherein
  the indication of field topography in the first area is indicative of a location of a crop bed in the first area relative to the agricultural harvesting machine, and
  the control system is configured to:
    determine that the harvesting device contacted a ground surface in the first area based on the in-situ data.

Example 19 is a control system for an agricultural harvesting machine having a harvesting device, the control system comprising:

at least one processor; and memory storing instructions executable by the at least one processor, wherein the instructions, when executed, cause the control system to:
  receive a first indication of field topography in a first area to be harvested in a path of the agricultural harvesting machine;
  control a position of the harvesting device to harvest the crop in the first area based on the first indication of field topography;
  receive in-situ data from the first area of the field after the first area is harvested by the harvesting device;
  receive a second indication of field topography in a second area of the field to be harvested; and
  control the position of the harvesting device to harvest the crop in the second area based on the in-situ data and the second indication of field topography in the second area Example 20 is the control system of any or all previous examples, wherein the harvesting device comprises a front-end assembly having a cutting device, and the control system is configured to:
  determine a height of a crop bed in the second area based on the in-situ data and the second indication of field topography in the second area; and
  set a cutting height of the cutting device based on the height of the crop bed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3-1 and 3-2 illustrate operation of an agricultural harvesting machine on a field, in one example.

FIGS. 5-1 and 5-2 (collectively referred to as FIG. 5) are a flow diagram illustrating one example of cutter height detection and control for an agricultural harvesting machine.

DETAILED DESCRIPTION

Figure 1:
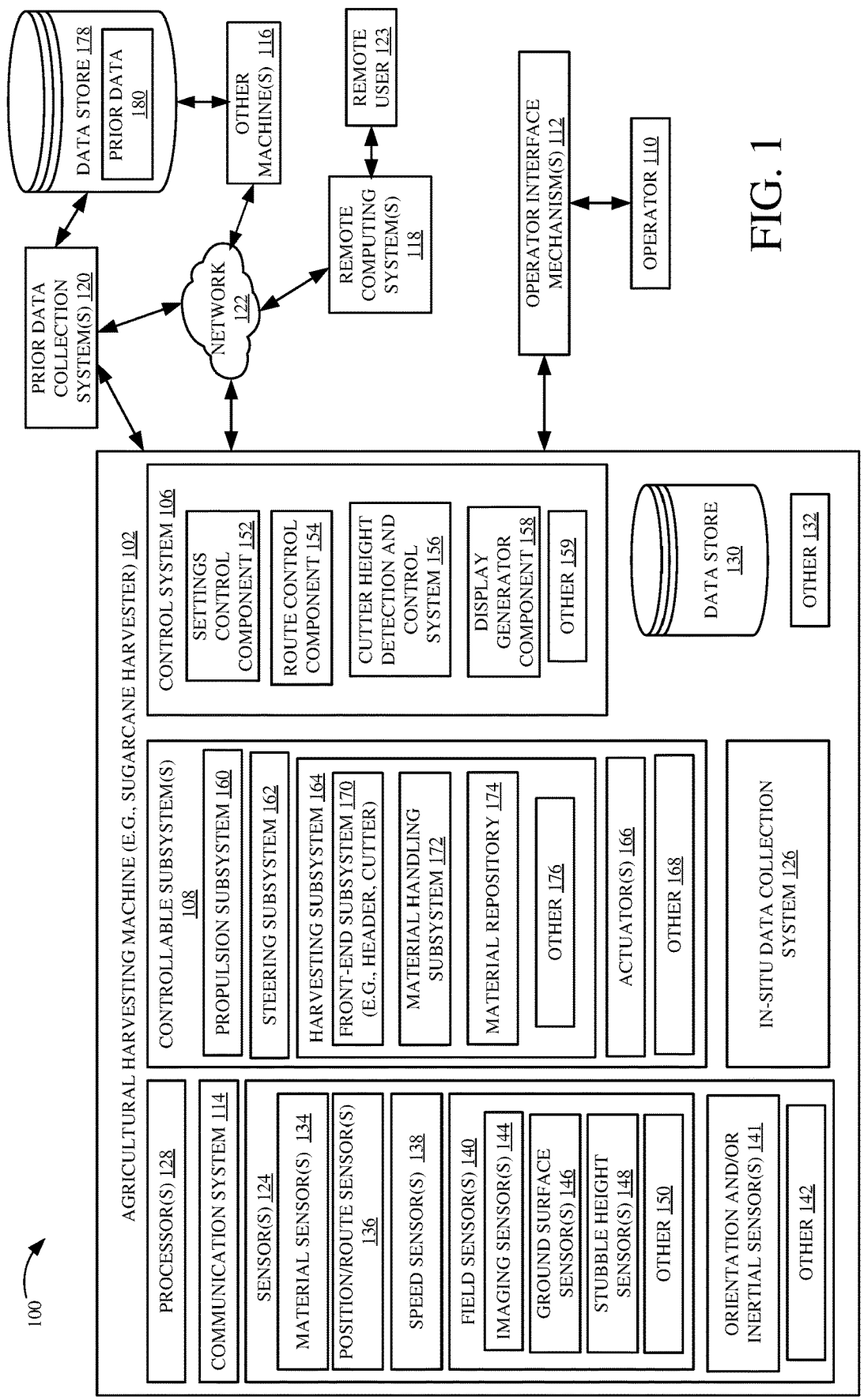
FIG. 1 is a block diagram showing one example of an agricultural harvesting machine architecture that includes an agricultural harvesting machine.

The present description generally relates to agricultural harvesting machines. More specifically, but not by limitation, the present description relates to cutter height control for an agricultural harvesting machine (or "harvester"). Depending on the crop being harvested, cutter height control can affect harvester efficiency (e.g., in terms of yield). For example, the height at which the crop is cut can change the levels of crop constituents, such as the amount of protein, sugar, starch, oil, nutrients, water, among various other constituents, in the harvested material. For sake of illustration, but not by limitation, the sugar content in sugarcane plants is typically concentrated in the lower section of the plant. Thus, if sugarcane plants are cut too high from the ground, a large portion of sugar content is left unharvested. In some yield scenarios, for every one inch of crop stubble left in the field or otherwise not harvested, approximately one-half ton per acre of crop yield can be lost. That being said, cutting below grade can result in excessive wear or other damage to the harvester, and can create undesired changes to field (or other worksite) topography. Also, the introduction of dirt, sand, soil, or other impurities can have detrimental effects on mill or other equipment.

In some instances, a forward-looking sensor is utilized to sense the crop bed ground surface in front of the harvester, so that the cutter height can be set accordingly. However, unharvested, standing crop in the target area ahead of the harvester can reduce the accuracy of the ground surface predictions. For example, in the case of sugarcane, the plant density and mature green cane has a high leaf trash content that inhibits the ability to find the crop bed ground surface with reasonably high accuracy and/or consistency. Inaccurate ground surface detection can result in setting the cutting height too high (e.g., resulting increased unharvested crop stubble) or too low (e.g., resulting in ground contact).

Alternatively, or in addition, a crop planting map, field topography map, or other field data map can be generated prior to the harvesting operation. For example, during a prior harvesting operation, data can be acquired from the harvester to generate a planting map indicating the location of the plants on the field along with field topography corresponding to the plant locations. However, over time, the location of the plants can migrate or move. For instance, some ratoon crops, such as sugarcane and other tropical grasses, sprout new shoots from the plant base after harvesting. This regrowth process can result in the plant being situation in a slightly different location in the field during the subsequent harvest, and that different location can have a different ground height. Further, the topography of the field can change over time due to weather conditions, machine operations on the field, etc.

The present discussion proceeds with respect to a control system for an agricultural harvesting machine, such as a sugarcane harvester, that is configured to detect harvester operational performance and set cutter height based on pre-harvest field data and post-harvest data obtained from in-situ sensors on the harvesting machine. It is noted that examples are discussed below in the context of a sugarcane harvester for sake of illustration, but not by limitation. It will be understood that aspects described herein can be utilized with other types of harvesting machines.

FIG. 1 is a block diagram showing one example of an agricultural harvesting machine architecture 100 that includes an agricultural harvesting machine 102. Agricultural harvesting machine 102 can include autonomous or semi-autonomous machines, such as robotic or self-driving vehicles. Thus, examples of machine 102 can operate in a fully autonomous mode and/or a semi-autonomous mode in which an operator is on-board or nearby to perform one or more functions. These functions may include, for example without limitation, one or more of guidance, safeguarding, diagnosis, task monitoring, task control, or data recording.

Machine 102 includes a control system 106 configured to control a set of controllable subsystems 108 that perform operations on a field. For instance, an operator 110 can interact with and control harvesting machine 102 through operator interface mechanism(s) 112. Operator interface mechanism(s) 112 can include such things as a steering wheel, pedals, levers, joysticks, buttons, dials, linkages, etc. In addition, mechanism(s) 112 can include a display device that displays user actuatable elements, such as icons, links, buttons, etc. Further, where the device is a touch sensitive display, those user actuatable items can be actuated by touch gestures. Similarly, where mechanism(s) 112 includes speech processing mechanisms, then operator 110 can provide inputs and receive outputs through a microphone and speaker, respectively. Operator interface mechanism(s) 112 can include any of a wide variety of other audio, visual or haptic mechanisms.

Harvesting machine 102 includes a communication system 114 configured to communicate with other systems or machines in architecture 100. For example, communication system 114 can communicate with other machines 116 (such as other machines operating on a same field as harvesting machine 102), remote computing system(s) 118, and/or prior data collection system(s) 120, either directly or over a network 122. Network 122 can be any of a wide variety of different types of networks. For instance, network 122 can be a wide area network, a local area network, a near field communication network, a cellular communication network, or any of a wide variety of other networks, or combinations of networks.

Communication system 114 can include wired and/or wireless communication components, which can be substantially any communication system that can be used by the systems and components of machine 102 to communicate information to other items, such as between control system 106, controllable subsystems 108, and sensors 124. In one example, communication system 114 communicates over a controller area network (CAN) bus (or another network, such as an Ethernet network, etc.) to communicate information between those items. This information can include the various sensor signals and output signals generated by the sensor variables and/or sensed variables.

A remote user 123 is illustrated as interacting with remote computing system 118, such as to receive communications from or send communications to harvesting machine 102 through communication system 114. For example, but not by limitation, remote user 123 can receive communications, such as notifications, requests for assistance, etc., from harvesting machine 102 on a mobile device.

System(s) 120 are configured to collect prior data that can be used by harvesting machine 102 in performing a harvesting operation on a field. Prior data can be generated from a wide variety different types or sources, such as from aerial or satellite images, thermal images, etc. The prior data can be used to generate a model, such as a predictive map, that can be used to control harvesting machine 102. Examples of prior data include, but are not limited to, field topography maps and crop planting maps, to name a few.

FIG. 1 also shows that harvesting machine 102 includes in-situ data collection system 126, one or more processors 128, a data store 130, and can include other items 132 as well. Sensors 124 can include any of a wide variety of sensors depending on the type of harvesting machine 102. For instance, sensors 124 can include material sensors 134, position/route sensors 136, speed sensors 138, field sensors 140, orientation and/or inertial sensors 141, and can include other sensors 142 as well.

Material sensors 134 are configured to sense material being moved, processed, or otherwise worked on by harvesting machine 102. In the case of an agricultural harvester, material sensors 134 include yield sensors.

Position/route sensors 136 are configured to identify a position of harvesting machine 102 and a corresponding route (e.g., heading) of harvesting machine 102 as machine 102 traverses the field. A geographic position sensor, for example, senses or detects the geographic position or location of agricultural harvester 102 and can include, but is not limited to, a global navigation satellite system (GNSS) receiver that receives signals from a GNSS satellite transmitter. Sensor 136 can also include a real-time kinematic (RTK) component that is configured to enhance the precision of position data derived from the GNSS signal. Sensor 136 can include a dead reckoning system, a cellular triangulation system, or any of a variety of other geographic position sensors. Speed sensors 138 are configured to output a signal indicative of a speed of harvesting machine 102.

Field sensors 140 are configured to obtain field data representing conditions or states of the field, which can be processed, for example by in-situ data collection system 126. Illustratively, field sensors 140 include in-situ sensors, such as imaging sensors 144, ground surface sensors 146, stubble height sensors 148, and can include other sensors 150. In-situ sensors can include on-board sensors that are mounted on-board harvesting machine 102 and/or remote in-situ sensors that capture in-situ information. In-situ (or field) data can thus be obtained in real time from sensors 124 on machine 102 and/or sensors on a support machine that works in parallel with machine 102.

Sensors 141 are configured to detect an orientation and/or inertia of machine 102. Sensors 141 can include accelerometers, gyroscopes, roll sensors, pitch sensors, yaw sensors, to name a few.

Control system 106 includes settings control component 152, route control component 154, cutter height detection and control system 156, and a display generator component 158. Control system 106 can include other items 159.

Controllable subsystems 108 can include propulsion subsystem 160, steering subsystem 162, harvesting subsystem 164, one or more different actuators 166 that can be used to change machine settings, machine configuration, etc., and can include a wide variety of other systems 168.

Propulsion subsystem 160 includes an engine (or other power source) that drives a set of ground engaging traction elements, such as wheels or tracks. Steering subsystem 162 is configured to control a direction of machine 102 by steering one or more of the ground engaging traction elements.

Harvesting subsystem 164 includes a front-end subsystem 170 having a harvesting device, such as a header, configured to engage and cut crop from the field. In the case of an example sugarcane harvester, harvesting device includes basecutters (or other cutting devices) and a knock down roller. Subsystem 164 also includes a material handling subsystem 172 configured to convey and/or process the crop cut by front-end subsystem 170 to a material repository 174. In one example of a combine harvester, material handling subsystem 172 can include a threshing system. Subsystem 164 can include other items 176 as well.

Imaging sensors 144 are configured to acquire images of the field, such as from areas of the field in front of subsystem 170 in a direction of travel (i.e., unharvested areas) and/or areas behind the header (i.e., already harvested areas).

Ground surface sensors 146 are configured to detect the ground surface of the field in one or more areas, which can also include unharvested areas in front of the subsystem 170 and/or already harvested areas behind subsystem 170. For instance, sensors 146 are configured to generate indications of crop bed height. The crop bed refers to the area in which the roots of the plant area are located. Therefore, the crop bed height is the height of the ground proximate the base of the stalk that emerges from the ground surface. In the case of sugarcane plants in rows, the crop bed height typically indicates the height of the ground at or near the center of the row. Sensors 146 can also generate indicates of furrow depth. A furrow, in the present case, refers to the area between the crop rows.

An example of ground surface sensor 146 includes a RADAR (radio detection and ranging) detection system that uses radio waves to determine a distance from the sensor location to the ground surface (e.g., the crop bed to be harvested). The determined distance and position of the sensor mounting location can be utilized to determine a height of the crop bed relative to the sensor. Then, based on the vertical distance between the sensor mounting location and the cutter on front-end subsystem 170, the height of the cutting device can be controlled to a desired position relative to the crop bed, i.e., to cut the crop at a desired height (e.g., one inch, two inches, etc.) from the top of the crop bed. In one example, a cutting height of the cutting device is set based on a pre-determined delta or offset to the determined height of the crop bed.

Settings control component 152 can control one or more of subsystems 108 in order to change machine settings based upon the predicted and/or observed conditions or characteristics of the field. By way of example, settings control component 152 can actuate actuators 166 that change the positioning of cutter based on predicted crop bed heights.

In one example, control of the traversal of machine 102 over the field can be automated or semi-automated, for example using an automated guidance system. For instance, route control component 154 is configured to guide machine 102 along a path across the field using the geographic position sensed by sensors 136. Subsystem 162 is configured to perform field operations while machine 102 traverses the field.

Display generator component 158 illustratively generates control interface displays for operator 110, or another user such as remote user 123. The display can be an interactive display with user input mechanisms for interaction by operator 110.

Data store 130 is configured to store data for use by machine 102. For example, in agricultural applications the data can include field location data that identifies a location of the field to be operated upon by a machine 102, field shape and topography data that defines a shape and topography of the field, crop location data that is indicative of a location of crops in the field (e.g., the location of crop rows), or any other data.

Prior data collection system 120 illustratively collects field data, such as prior data corresponding to a target field to be operated upon by machine 102. Briefly, by prior, it is meant that the data is formed or obtained beforehand, prior to the operation by machine 102. The data generated by system 120 can be sent to machine 102 directly and/or can be stored in a data store 178 as prior data 180. Control system 106 can use data 180 to control operation of one or more subsystems 108.

Figure 2:
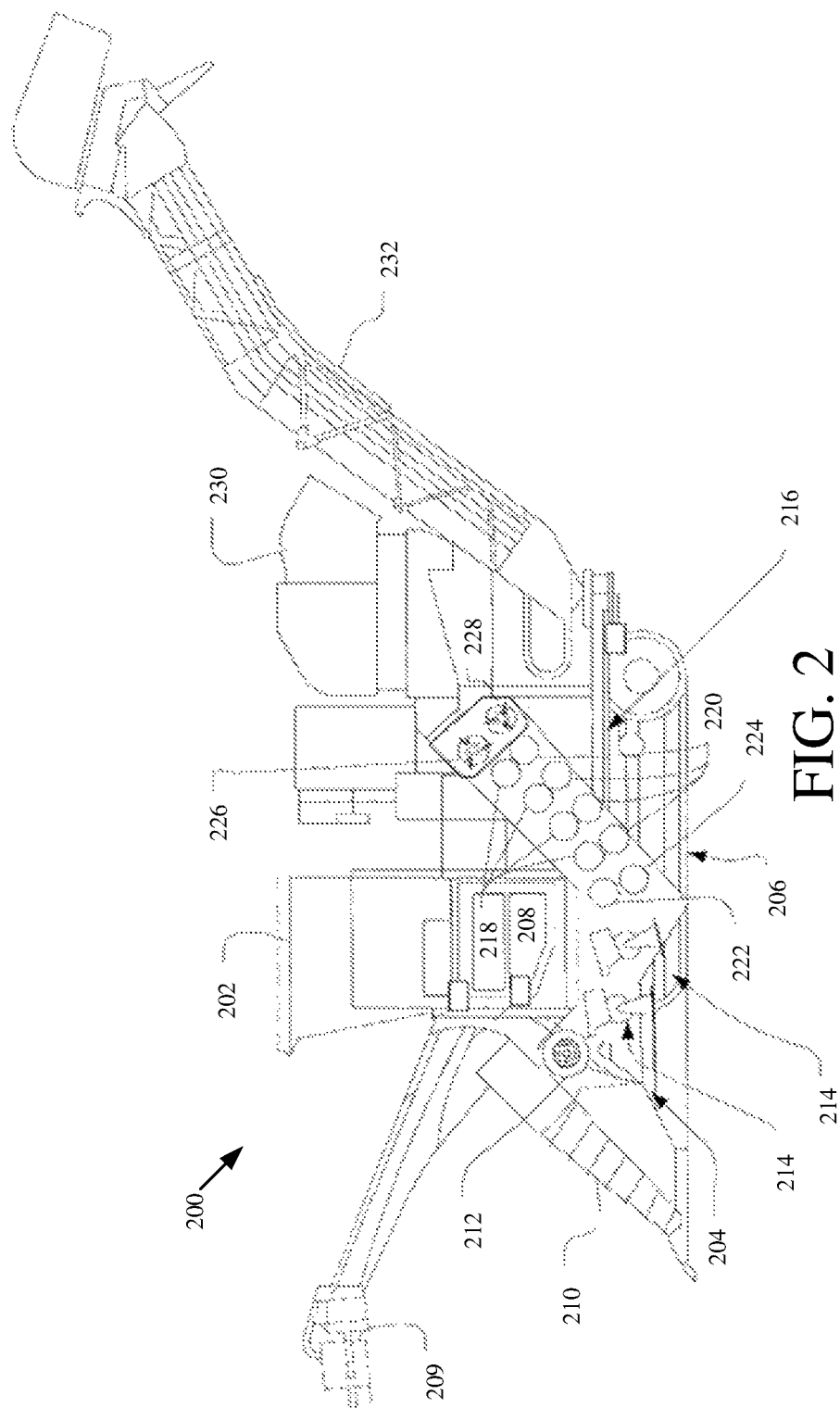
FIG. 2 illustrates an example of an agricultural harvesting machine.

As noted above, harvesting machine 102 can take a wide variety of different forms. FIG. 2 illustrates one example of an agricultural harvesting machine. More specifically, FIG. 2 is a simplified side view of a sugarcane harvester 200.

As shown in FIG. 2, harvester 200 includes a cab 202 for an operator (e.g., operator 110) and a frame 204 that supports various cutting, routing and processing devices. Frame 204 is supported by a transport frame, such as a track frame supporting track assemblies 206. In another example, harvester 200 can include wheels supported by axel assemblies.

An engine 208 powers a main hydraulic pump (not shown) and various driven components of harvester 200 can be powered by hydraulic motors (not shown) receiving hydraulic power from the main hydraulic pump.

A cane topper 209 extends forward of frame 204 and is configured to remove the leafy tops of sugarcane plants (not shown). A set of crop dividers (e.g., left-side divider 210 shown in FIG. 2) is configured to guide the remainder of the sugarcane toward internal mechanisms of harvester 200 for processing. As harvester 200 moves across the field, plants passing between the crop dividers 210 are deflected downward by a knockdown roller 212 before being cut near the base of the plants by one or more basecutters (or other cutting devices) 214.

Rotating disks, guides, paddles (not shown in FIG. 2) or other transport devices on basecutter(s) 214 are configured to direct the cut ends of the plants upwardly and rearwardly within harvester 200 toward a feed train 216, which can include successive pairs of upper and lower feed rollers 218 and 220. A set of intake rollers 222 and 224 are configured to receive cut sugarcane from basecutters 214 at the front end of feed train 216. Feed rollers 218 and 220 are rotated to convey the received sugarcane toward chopper drums 226 and 228 for chopping into relatively uniform billets. The sugarcane can be cleaned by a primary extractor 230 and carried up a loading elevator 232 for discharge into a trailing truck or other receptacle (not shown in FIG. 2).

Figures 1, 3:
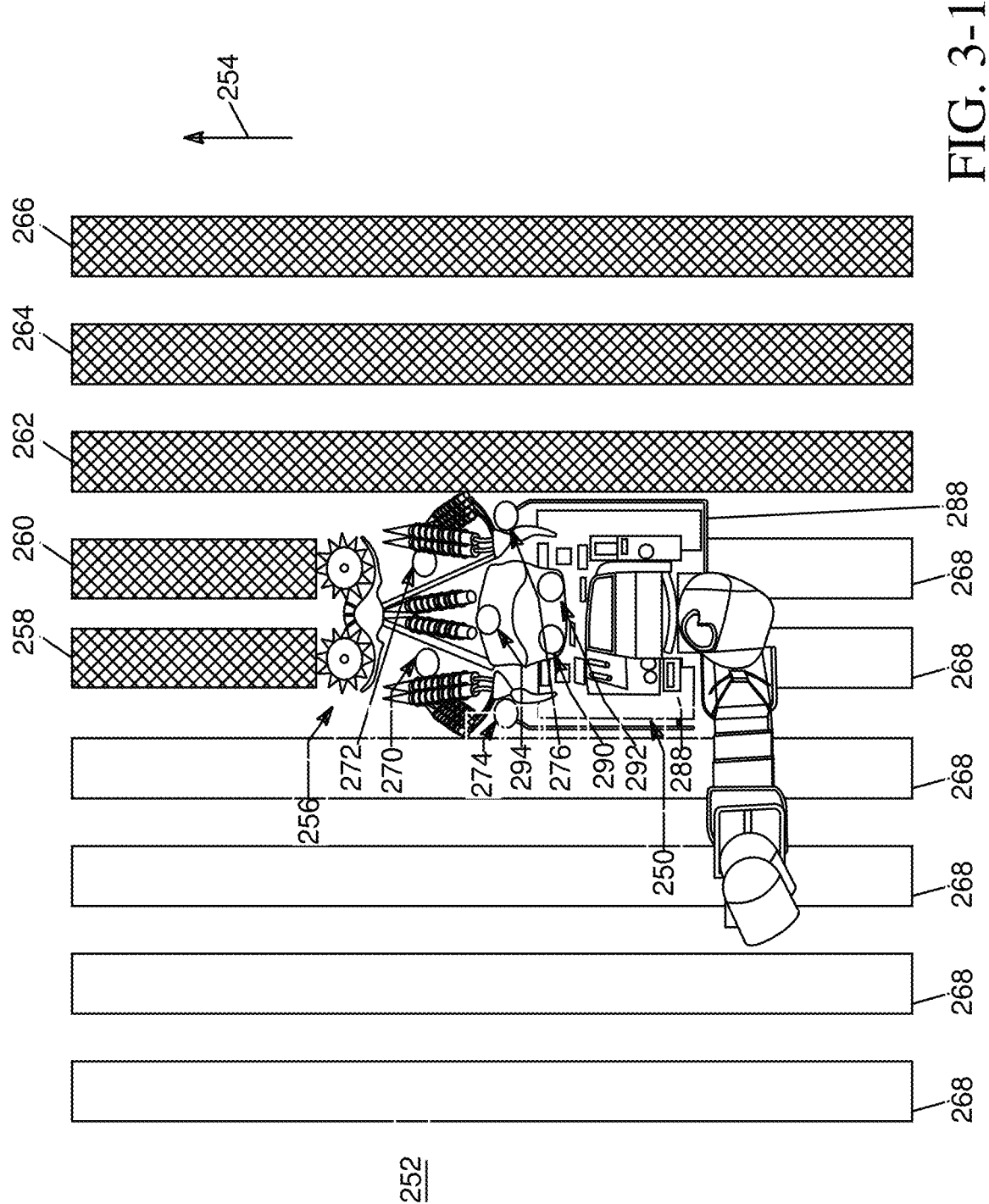
Figures 2, 3:
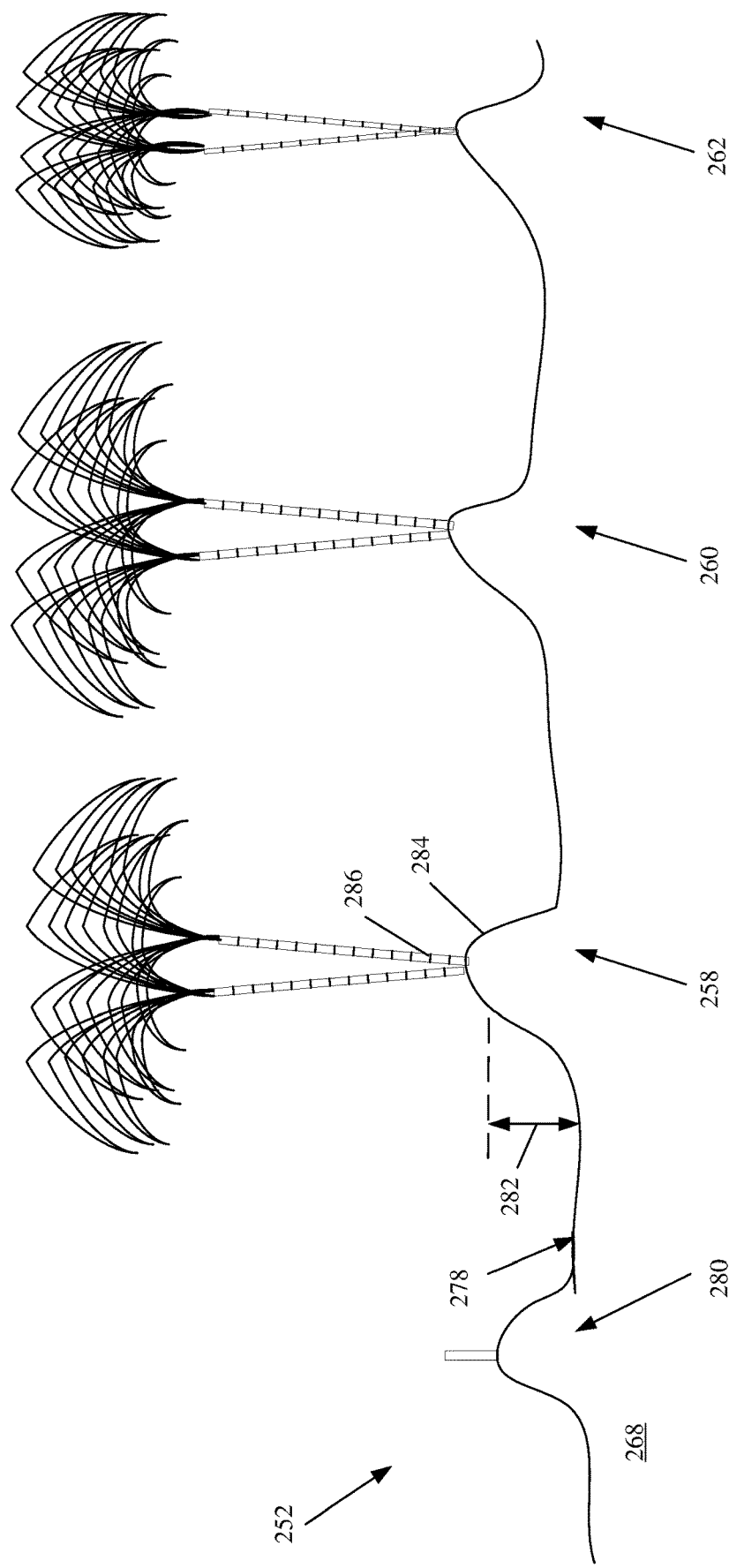

FIGS. 3-1 and 3-2 illustrate one example of a sugarcane harvester 250 (such as, but not limited to, harvester 200 shown above) operating on a field 252. FIG. 3-1 is a top view of harvester 250 and FIG. 3-2 is a side view of a portion of field 252.

As harvester 250 moves in a direction of travel 254, a harvesting device 256 on the front end of harvester 250 (e.g., a header having a basecutter, rollers, etc., such as that illustrated above with respect to FIG. 2) engages and cuts crop from one or more crop rows. In the present example, harvester 250 is configured to simultaneously harvest crop from first and second crop rows 258 and 260. Of course, harvester 250 can be configured to harvest crop from more than or less than two rows at a time. A plurality of unharvested crop rows 262, 264, and 266 are also shown in FIGS. 3-1 and 3-2. Reference numeral 268 illustrate areas of field 252 that have already been harvested by harvester 250.

Harvester 250 includes a plurality of field sensors (e.g., field sensors 140 illustrated in FIG. 1). Pre-harvest in-situ field sensors 270 and 272 are configured to obtain indications of field topography in unharvested areas in the path of harvester 250 (e.g., crop beds in crop rows 258 and 260). Thus, sensors 270 and 272 are configured to detect field topography on areas of field 252 prior to those areas being harvested by harvesting device 256. Some examples include, but are not limited to, RADAR detection systems, ultrasonic sensors, cameras or other imaging sensors, etc.

Harvester 250 also includes a plurality of post-harvest in-situ field sensors configured to receive in-situ data from the areas of field 252 after those areas have been harvested by harvesting device 256. In the illustrated example, post-harvest in-situ field sensors 274 and 276 are configured to measure furrow depth between adjacent crop beds. "Crop bed" refers to the planting locations of the crop plants (generally in rows), and "furrow" refers to the area between adjacent crop beds. For sake of illustration, as shown in FIG. 3-2, a furrow 278 is formed between crop row 258 and crop row 280 in the already harvested area 268. Furrow depth 282 represents a distance from the bottom of the furrow 278 to a reference point, that can be utilized by harvester 250. In one example, the furrow depth 282 represents the distance from the crop bed 284 to the bottom of the furrow 278. In another example, the furrow depth can be the distance from the sensor mounting location on harvester 250 to the bottom of the furrow 278. Similarly, the crop bed or ground height represents a distance from a reference point to the top of crop bed 284. For example, based on sensor signals from sensor 270, harvester 250 can determine the distance from sensor 270 to the top of crop bed 284, and this distance can be utilized to control harvesting device 256 to cut the sugarcane plants 286 at a desired height from the crop bed 284. Additionally, sensor 276 can generate sensor signals indicative of furrow depth between rows 260 and 262. Similarly, sensor 274 can generate sensor signals indicative of furrow depth between row 258 and previously harvested row 280.

Off board map layers can be created to show pre and post row profile and topography of the fields, based on the sensor signals, over time.

During operation, the tracks 288 are controlled to move along these furrows to avoid damage to the ratoons. Also, sensors 274 and/or 276 generate sensor signals indicative of the crop bed height of the adjacent row, that is adjacent to harvester 250. For example, sensor 276 receives an indication of the crop bed height of crop row 262 adjacent to harvester 250, as harvester 250 is harvesting crop row 260. As discussed in further detail below, this indication of the adjacent crop row height can be used as a prediction of ground height during the subsequent pass of harvester 250 on field 252 that harvests crop row 262.

Harvester 250 also includes in-situ field sensors 290 and 292 that acquire data representing the area of crop rows 258 and 260 that have already been harvested by harvesting device 256. For example, sensors 290 and 292 can generate indications of the height of the crop bed of rows 258 and 260, after the crop has been harvested from that area of field 252. Alternatively, or in addition, sensors 290 and 292 can generate indications of stubble height remaining after the crop has been cut by harvesting device 256.

Harvester 250 also includes a gyroscope or other orientation sensor 294 configured to sense a pitch and/or roll of harvester 250 as harvester 250 travels over field 252.

Figure 4:
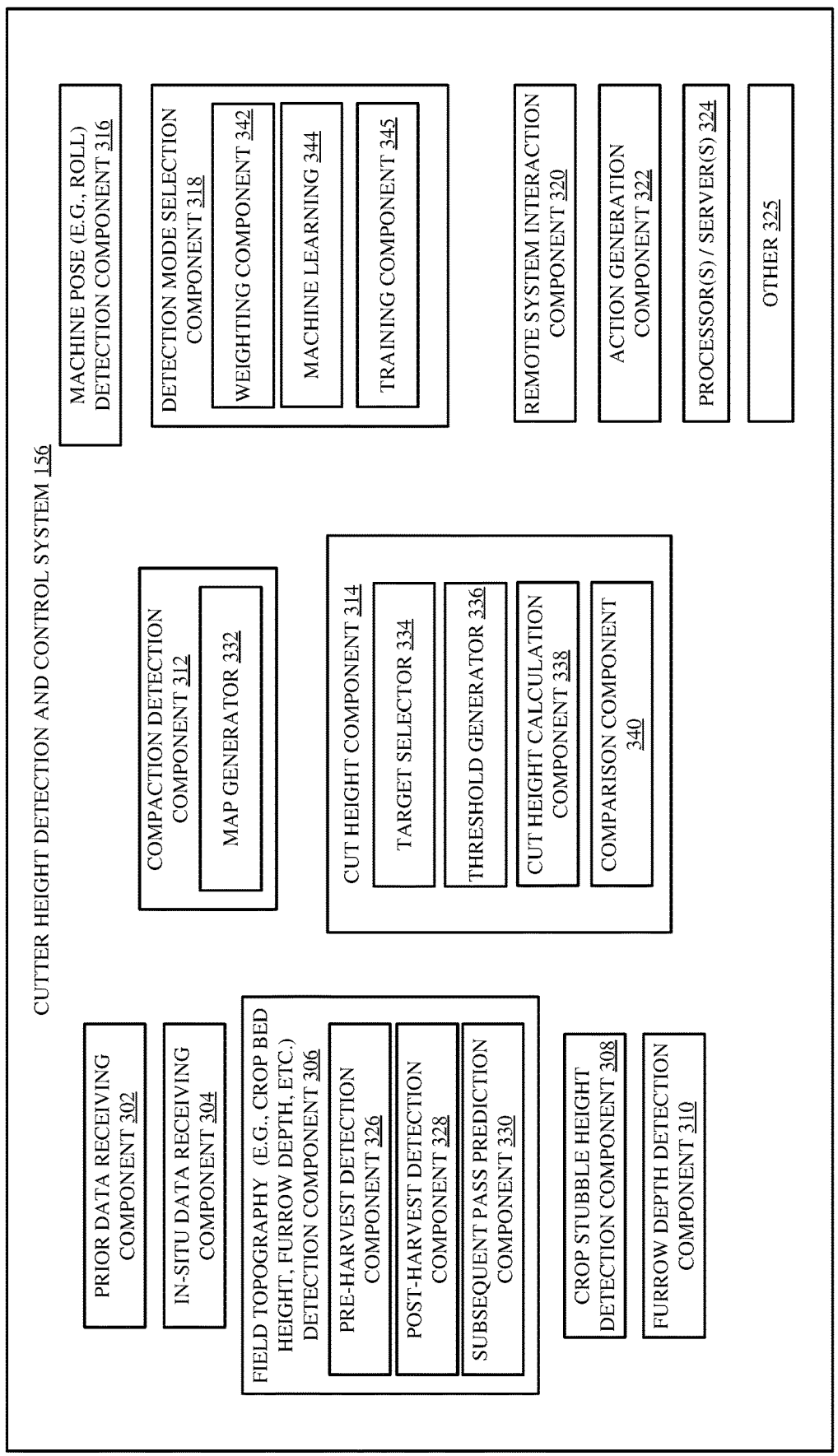
FIG. 4 is a block diagram illustrating one example of a cutter height detection and control system.

FIG. 4 is a block diagram illustrating one example of cutter height detection and control system 156. As shown, system 156 includes a prior data receiving component 302, an in-situ data receiving component 304, a field topography detection component 306, a crop stubble height detection component 308, a furrow depth detection component 310, a compaction detection component 312, a cut height component 314, a machine pose detection component 316, a detection mode selection component 318, a remote system interaction component 320, and an action generation component 322. System 156 is also illustrated as having one or more processors or servers 324, and can include other items 325 as well.

Prior data receiving component 302 is configured to receive previously generated or collected data, for example from prior data collection system 120 illustrated in FIG. 1. The prior data can include, but is not limited to, sensor data obtained from other machines, such as other agricultural machines, unmanned aerial vehicles or drones, to name a few. Also, the prior data can include field planting maps, field terrain maps, and field compaction maps.

In-situ data receiving component 304 is configured to receive in-situ data, which includes ground-truthed data and/or data acquired in real time or substantially real time during operation of harvesting machine 102. The data can be obtained from sensors 124 and/or from in-situ data collection system 126.

Field topography detection component 306 is configured to detect field topography, such as crop bed height, furrow depth, etc., based on the prior data and/or in-situ data. Component 306 can include a pre-harvest detection component 326 configured to detect field topography in areas of the field prior to the current harvesting operation being performed by harvesting machine 102. With respect to the example of FIG. 3-1, crop bed height and/or furrow depth can be identified based on sensor signals from sensors 270 and 272. Also, component 306 includes a post-harvest detection component 328 configured to detect field topography in areas of the field after the harvesting operation being performed by harvesting machine 102. For example, component 328 can identify crop bed height, furrow depth, etc. based on sensor signals received from sensors 276, 278, 290, and/or 292. Component 306 also includes a subsequent pass prediction component 330 configured to generate a prediction of field topography in an adjacent crop row, for a subsequent pass. In the example of FIG. 3-1, component 330 predicts a crop bed height for row 262 based on sensor signals received from sensor 276.

Crop stubble height detection component 308 is configured to detect a crop stubble height in the post-harvest areas of the field. For example, based on sensor signals from sensors 290 and 292, component 308 determines the height of the crop stubble left in rows 258 and 260 after being harvested by harvesting device 256. In one example, the crop stubble height detection can be based on image processing on images acquired from imaging sensors, or any other suitable sensor inputs.

Furrow depth detection component 310 is configured to detect the depth of furrows between crop rows. It is noted that the furrow depth can be detected pre-harvest as well as post-harvest, and detected changes in furrow depth can be utilized by component 312 to generate a compaction metric that indicates a degree to which the furrow has been compacted by traversal of harvester 102 over the field. In one example, component 312 includes a map generator 332 configured to generate a compaction map that indicates, for different areas of the field, compaction which indicates changes to the field topography due to the operation of harvesting machine 102.

Cut height component 314 includes a target selector 334 configured to select a target cut height, which can be based on operator input, automatically based on automated processes, or in other ways. Component 314 includes a threshold generator 336 that generates a cut height threshold, a cut height calculation component 338 configured to calculate the position of harvesting device 256 to achieve the target cut height, and a comparison component 340 configured to compare the cut height to the threshold.

Machine pose detection component 316 is configured to detect changes to the pitch and/or roll of machine 102 as machine 102 traverses the field. For example, harvesting machine 102 can experience side-to-side roll due to differences in furrow depth and/or different degrees of compaction as the tracks, wheels, or other traction elements traverse through the furrows.

Detection mode selection component 318 is configured to select from a plurality of different detection modes, for generating post-harvest performance. For example, component 318 can include a weighting component 342 for weighting different detection modes and a machine learning component 344 for selecting the detection modes. A training component 345 is configured to train machine learning component 344 based on training data.

For example, component 316 can utilize a predictive model that is revised as machine 102 is performing an operation and while additional in-situ sensor data is collected. The revision of the model in response to new data can employ machine learning methods. Without limitation, machine learning methods can include memory networks, Bayes systems, decisions trees, Eigenvectors, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Cluster Analysis, Random Forests, Reinforcement Learning or Reward-based machine learning. Learning may be supervised or unsupervised.

For instance, artificial intelligence (AI) can be utilized to identify machine capabilities, and to determine how to adjust machine settings to achieve work assignment criteria and the target work quality. The machine learning and training components can include a variety of different types of learning mechanisms, such as a neural network that is trained based on corresponding training logic using training data. Briefly, a neural network can include a deep neural network (DNN), such as a convolutional neural network (CNN). Of course, other types of classification or learning mechanisms, such as rule-based classifiers, Bayesian network, decision trees, etc. can be utilized.

Machine learning component 344 includes a machine learning model configured to determine changes to settings of subsystems 108 that achieves the target work quality of machine 102. The machine learning model can take into consideration inputs from external sensors Remote system interaction component 320 is configured to interact with a cloud computing system or other remote computing system, such as system 118 illustrated in FIG. 1. Action generator component 322 is configured to generate action signals for controlling controllable subsystems 108, communication system 114, sensors 124, or any other component in harvesting machine 102.

Figures 1, 5:
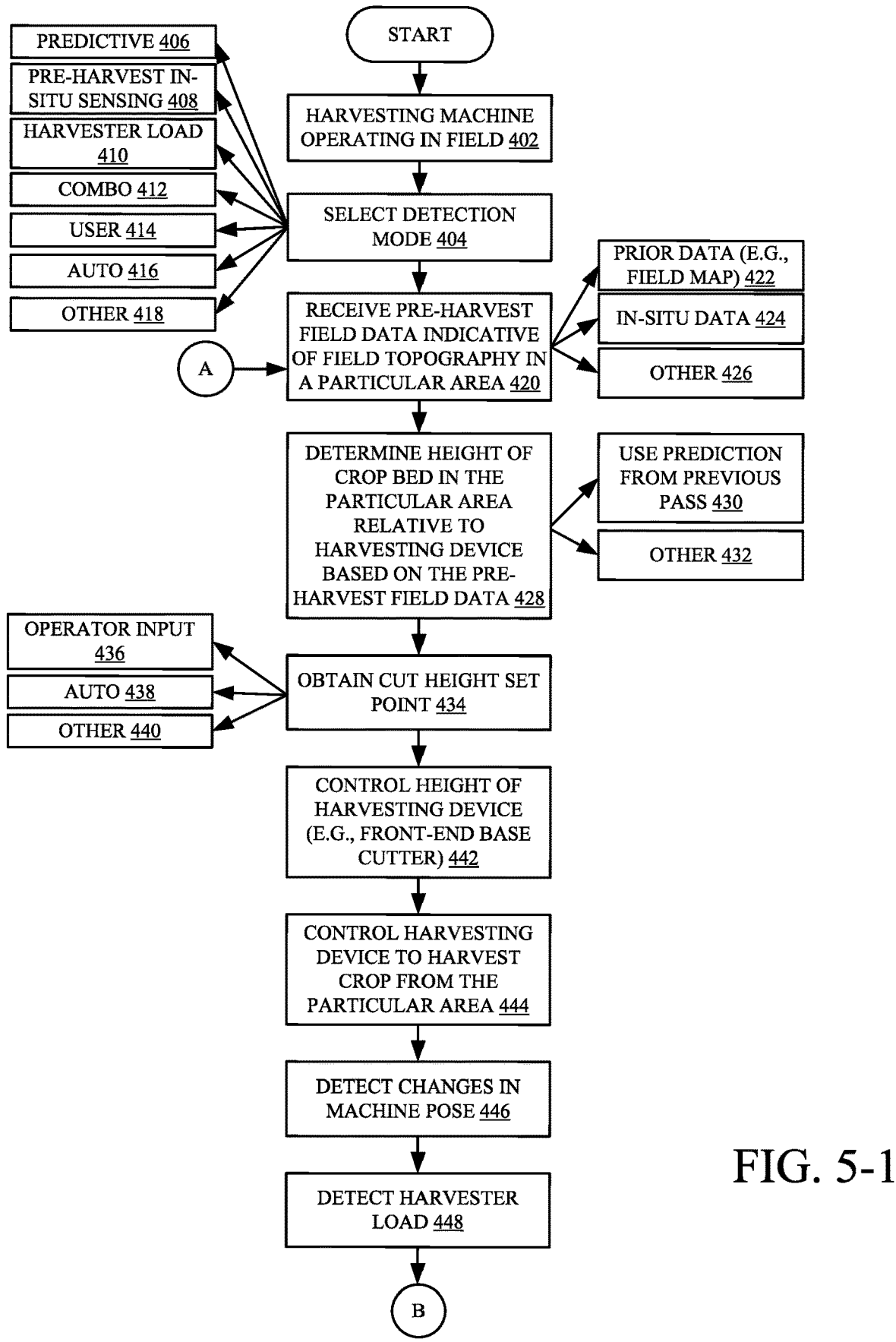
Figures 2, 5:
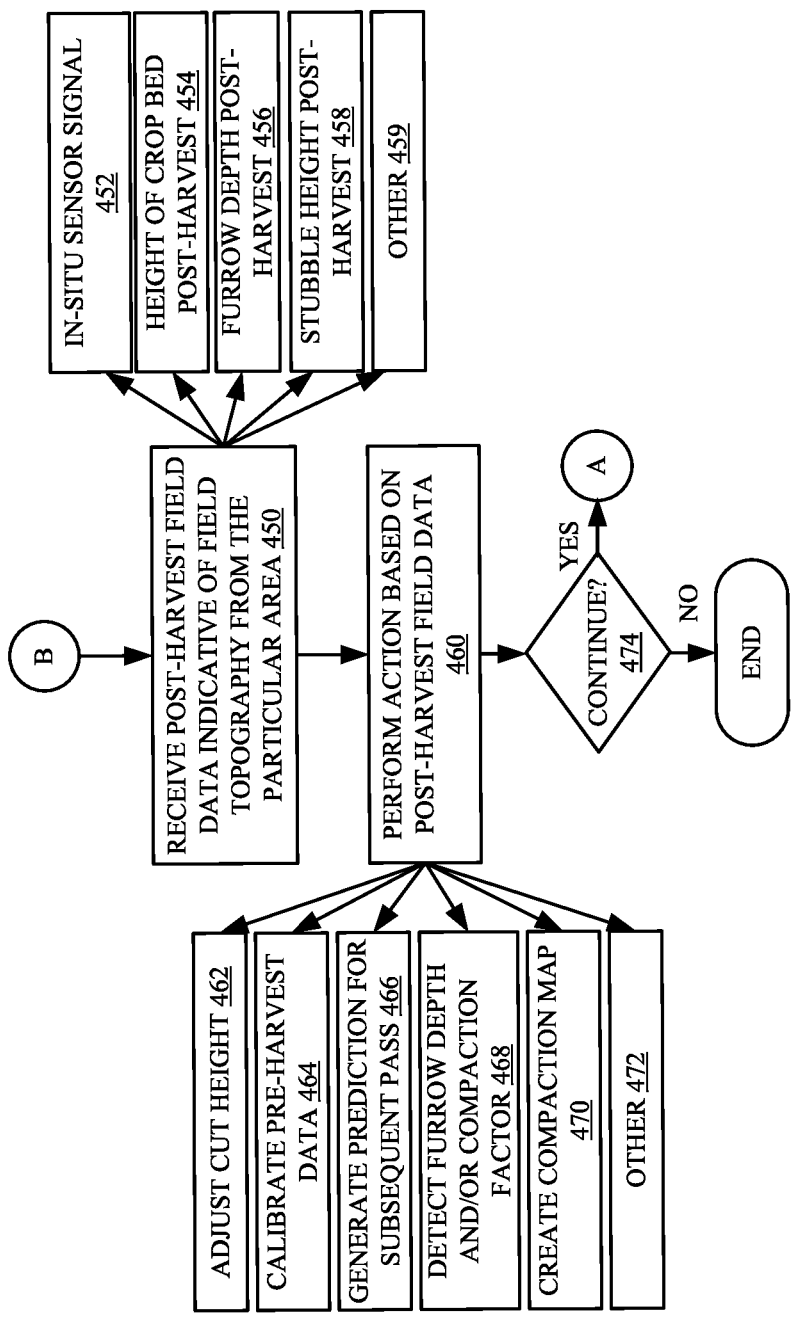

FIG. 5 is a flow diagram illustrating one example of cutter height detection and control for an agricultural harvesting machine. For sake of illustration, but not by limitation, FIG. 5 will be discussed in the context of FIG. 4.

At block 402, machine 102 is operating in a field. A detection mode is selected at block 404. One example of detection mode selection is discussed below with respect to FIG. 11. Briefly, however, the detection mode defines a data source and scheme for cutter height control. For example, the selected mode can include a predictive mode (block 406) that generates and utilizes predictions on crop bed height. Another example detection mode includes pre-harvest in-situ sensing (block 408) that utilizes in-situ sensors for detecting field topography in areas of the field prior to harvest. Also, a detection mode can utilize harvester load (block 410), such as pressure sensors that detect a type of load on the cutter drive motors, which can indicate performance of the basecutter (e.g., whether the basecutter is cutting too high or too low). The detection mode can also utilize a combination of various types of inputs and control schemes, as represented at block 412.

The detection mode can be selected by operator 110 or other user (block 414), and/or automatically (block 416). Of course, the detection mode can be selected in other ways as well, as represented at block 418.

At block 420, pre-harvest field data is received that indicates field topography in a particular area of the field. For example, the data can include prior data, as represented at block 422. As noted above, the prior data can include a field map previously generated or obtained, prior to the current operation of machine 102 on the field. Also, as represented at block 424, the pre-harvest field data can include in-situ data generated based on in-situ sensors during the current operation of machine 102. With respect to the example of FIG. 3-1, the in-situ data can include data generated based on input from one or more of sensors 270, 272, 274, 276, 290, and 292. Of course, pre-harvest field data can include other types of data as well, as represented at block 426.

At block 428, a height of a crop bed in the particular area is determined based on the pre-harvest field data. In one example, the height determination utilizes a prediction generated based on a previous pass, as represented at block 430. Of course, the height of the crop bed can be determined in other ways as well, as represented at block 432.

At block 434, a cut height set point is obtained. The cut height set point represents a height at which the crop is to be cut from the top of the crop bed. As noted above, in the case of sugarcane harvesting, it is often desired to cut the sugarcane stalk close to ground level, without contacting the ground. The cut height set point can be obtained in any of a number of ways. For example, the cut height set point can be based on operator input at block 436. Also, the cut height set point can be automatically obtained at block 438, for example based on a mission plan or automated control scheme. Of course, the cut height set point can be set in other ways as well, as represented at block 440.

At block 442, a height of the harvesting device (e.g., a basecutter) is controlled based on the determined height of the crop bed and the cut height set point. The harvesting device is controlled at block 444 to harvest crop from the particular area. During harvesting, changes in machine pose can be detected at block 446, and changes to the harvesting device load can be detected at block 448.

At block 450, post-harvest field data is received and is indicative of the field topography from the particular area, after the crop has been harvested from that area. In one example, the post-harvest field data is based on in-situ sensor signals, for example from one or more of sensors 274, 276, 290, or 292, as represented at block 452. The post-harvest field data can include field topography such as the height of the crop bed in the post-harvest area (block 454), and/or furrow depth (block 456). Alternatively, or in addition, stubble height is detected post-harvest at block 458. Of course, other post-harvest field data can be obtained as well, as indicated at block 459.

At block 460, one or more actions are performed based on the post-harvest field data. For example, the cut height can be adjusted at block 462. For instance, if the stubble height detected at block 458 is determined to have more than a threshold deviation from the cut height set point, the cut height can be raised or lowered. In one particular example, assume the cut height set point is set to cut sugarcane stalk at one inch from the crop bed. If the stubble height is subsequently determined to be three inches, then the cutter height can be lowered by two inches. In another example, if the post-harvest field data indicates that the height of the crop bed post-harvest is lower than the crop bed height from the pre-harvest field data, then control system 156 can determine that the harvesting device has contacted the field, that is the harvesting device has scraped a portion of the soil as the harvesting device performed the harvesting operation. In this case, the cutter height can be raised to reduce the likelihood of further ground contact. Alternatively, or in addition, at block 462, a height of one or more crop collecting and gathering devices (e.g., scroll or crop dividers, etc.) is controlled based on detected furrow depth.

At block 464, the pre-harvest data collection can be calibrated, based on the post-harvest field data. For example, with respect to FIG. 3-1, pre-harvest in-situ sensor 270 is calibrated based on a determination from sensor data generated by sensor 290. For instance, if sensor 290 indicates a ground height that is two inches higher than the ground height detected by sensor 270, then the output from sensor 270 can be calibrated to return a more accurate measurement.

In the case of prior data, such as a field map, the calibration at block 464 can adjust the prior data based on the post-harvest field data. For instance, prior harvesting operations, spraying operations, or other field care operations, weather, erosion, etc. can change the field topography from the time the data was acquired, and block 464 can adjust the data based on ground-truth data in real time.

At block 466, a prediction for a subsequent pass can be generated, based on the post-harvest field data. For example, as discussed above with respect to FIG. 3-1, sensor 276 can acquire an indication of furrow depth between rows 260 and 262 and an indication of crop bed height in row 262. This indication of crop row height from sensor 276 can be utilized as a prediction for the crop bed height for row 262 when harvester 250 makes a subsequent pass to harvest rows 262 and 264.

At block 468, furrow depth can be detected from the post-harvest field data. For example, with reference again to FIG. 3-1, sensor 276 can generate an indication of furrow depth between rows 260 and 262. Changes in the furrow depth from pre-harvest to post-harvest can be utilized to generate a compaction factor that indicates a degree to which traversal of harvesting machine 102 has compacted the given furrow. Also, compaction can be detected based on the machine pose, e.g., roll angle indicating a degree to which machine 102 has rolled to one side or the other. A compaction map can be created at block 470, and can be stored and/or output for future field operations. Of course, other actions can be performed as well, as represented at block 472.

At block 474, if the harvesting operation is continued, operation returns to block 420 for subsequent areas of the field.

Figure 6:
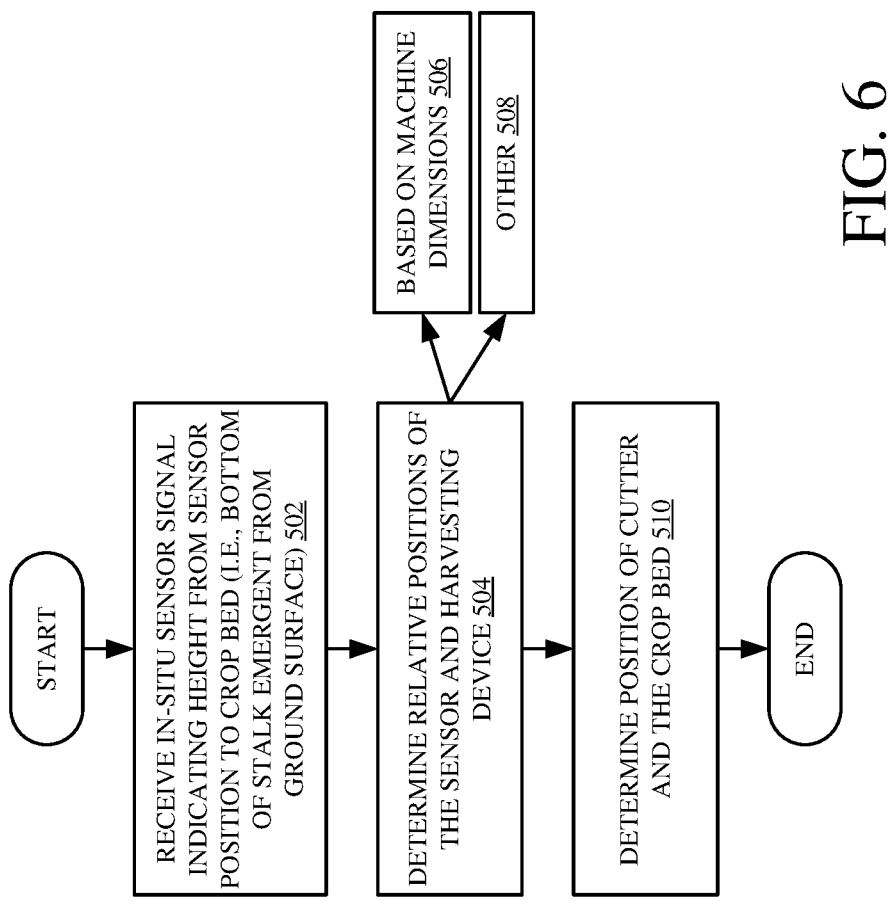
FIG. 6 is a flow diagram illustrating one example of determining height of a crop bed.

FIG. 6 is a flow diagram illustrating one example of determining the height of a crop bed at block 428 in FIG. 5. At block 502, an in-situ sensor signal is received indicating vertical distance from the sensor position to the top of the crop bed. For example, the pre-harvest field data received at block 420 can include a sensor signal from sensor 270 through the standing crop in front of harvesting machine 102. A distance between the sensor position of sensor 270 and the crop bed in row 258 is determined.

At block 504, the relative positions of the sensor and the harvesting device (e.g., the basecutter) is determined. For example, the determination can be based on machine dimensions stored in data store 130, as represented at block 506. Of course, the relative positions can be determined in other ways as well, as represented at block 508.

At block 510, the position of the cutter and the crop bed are determined based on the distance from the crop bed to the sensor position and the relative positions of the sensor and the harvesting device.

Figure 7:
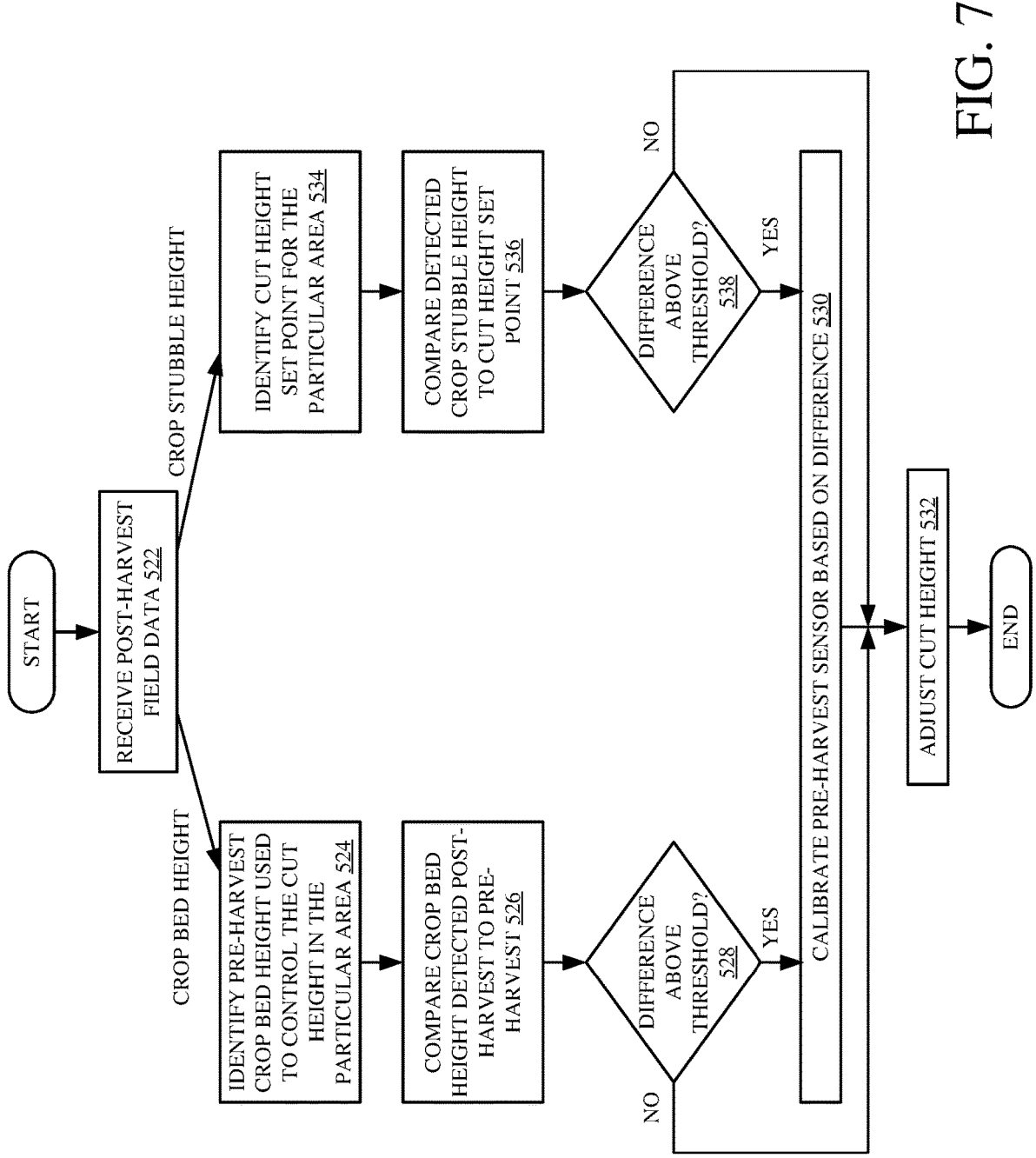
FIG. 7 is a flow diagram illustrating one example of sensor calibration based on post-harvest in-situ data.

FIG. 7 is a flow diagram illustrating one example of calibration at block 464 in FIG. 5. At block 522, post-harvest field data is received, for example sensor signals from sensor 290, map layers generated by system 156, etc. The field data can indicate crop bed height and/or crop stubble height. For example, crop bed height is determined based on a z component of coordinates detected at the field surface. Further, crop stubble height can be calculated by component 308 based on signals from sensors 148.

For crop bed height data, at block 524 the pre-harvest crop bed height, that was used to control the cutting height, is identified. The crop bed height detected post-harvest is compared to the identified pre-harvest crop bed height at block 526. If the difference is above a threshold at block 528, then at block 530 the pre-harvest sensor is calibrated based on the difference. As noted above, if the crop bed height detected pre-harvest is significantly different than the crop bed height detected post-harvest, the pre-harvest sensor is calibrated so that its output more closely corresponds to the post-harvest detection.

At block 532, the cutting height is adjusted based on the post-harvest data. For example, if the post-harvest crop bed height is determined to be lower than the pre-harvest height, the cutter height can be raised to reduce the likelihood of further ground contact by the cutter.

Referring again to block 522, if the post-harvest field data indicates crop stubble height, block 534 identifies a cut height set point for the particular area. That is, block 534 determines the expected crop stubble height. In other words, if the crop height is set to cut two inches from the crop bed, then approximately two inches of crop stubble would be expected post-harvest. At block 536, the detected crop stubble height is compared to the cut height set point. If the difference is above a threshold at block 538, the pre-harvest sensor can be calculated, as noted above.

Figure 8:
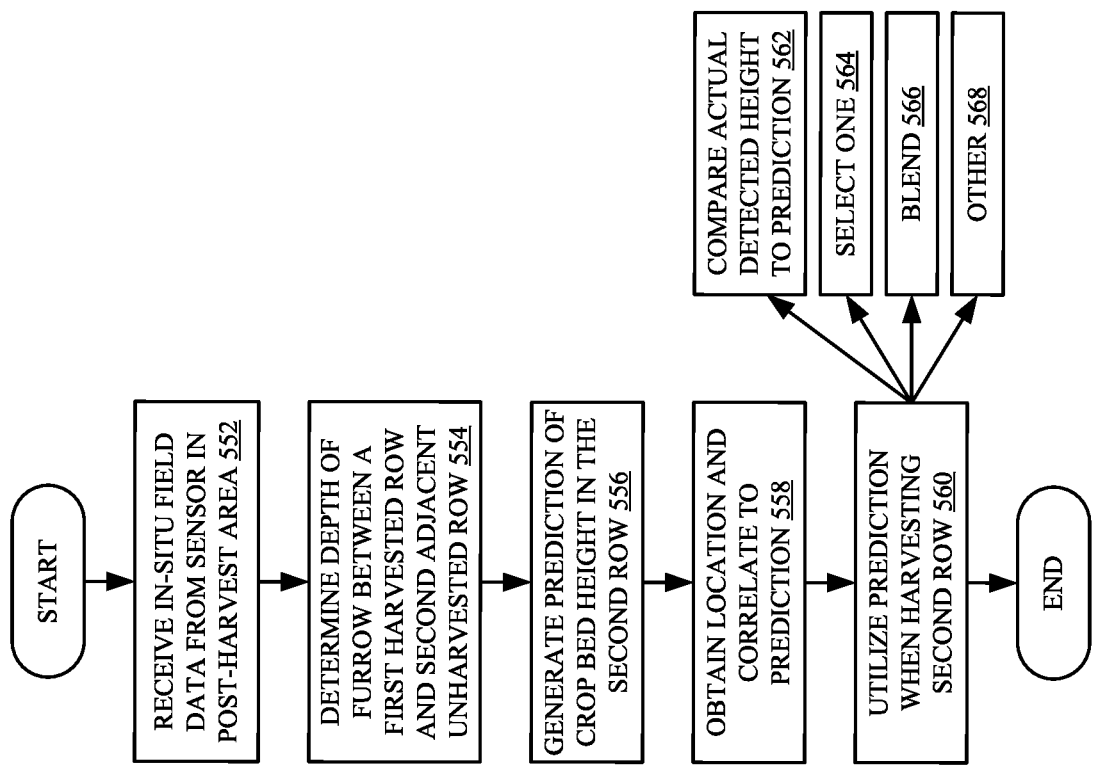
FIG. 8 is a flow diagram illustrating one example of generating a crop bed height prediction.

FIG. 8 is a flow diagram illustrating one example of generating a prediction at block 466 shown in FIG. 5. At block 552, in-situ field data is received from a sensor, such as sensor 276, in the post-harvest area. A depth of the furrow between a first harvest row (e.g., row 260) and a second adjacent unharvested row (e.g., row 262) is determined at block 554. At block 556, a prediction of the crop bed height in the second row (e.g., row 262) is generated based on the field data. The prediction is correlated to the corresponding location along row 262, as represented at block 558.

At block 560, the prediction is utilized when harvesting the second row during a subsequent pass by the harvesting machine. For example, in the second pass, system 156 can include comparing an actual sensed crop bed height (sensed by sensor 272 ahead of the machine) to the predicted value, as represented at block 562. At block 564, one of the predicted or actual values can be selected at block 564. The actual and predicted values can be blended at block 566, or the crop row height prediction can be utilized in other ways as well, as represented at block 568.

Figure 9:
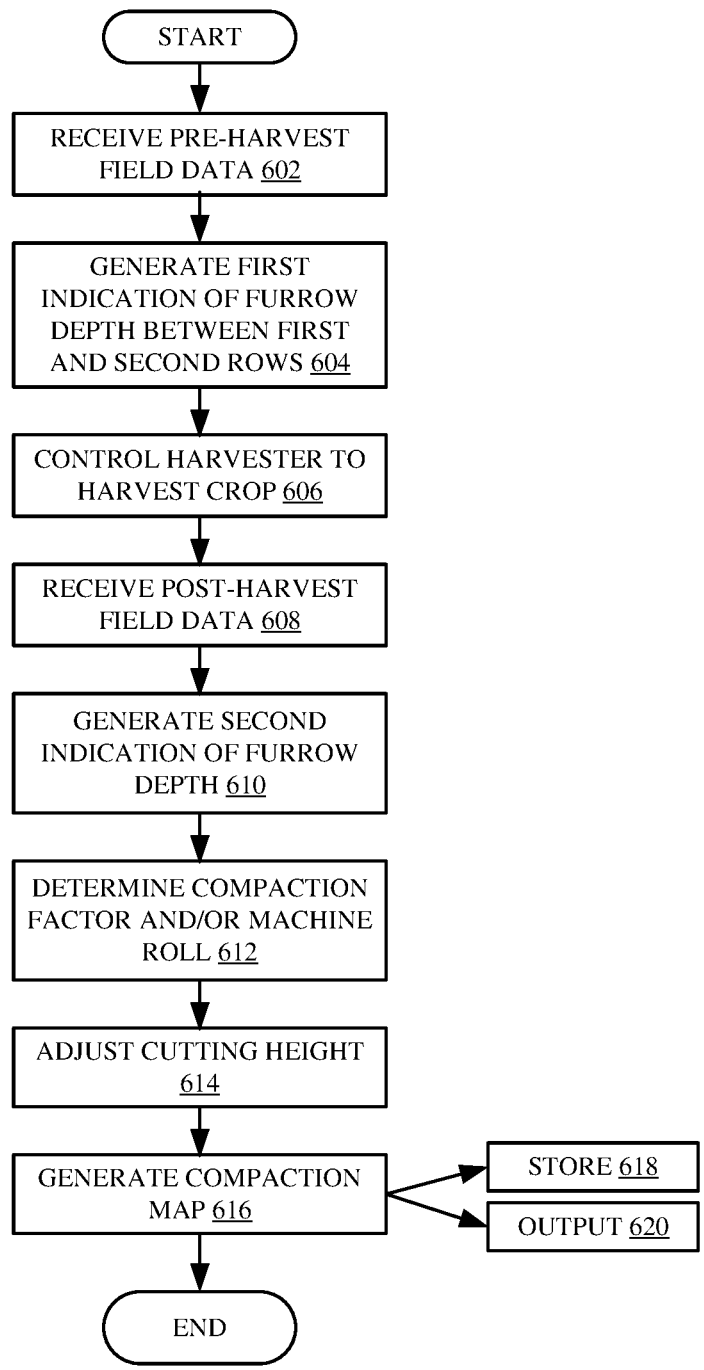
FIG. 9 is a flow diagram illustrating one example of furrow depth and compaction factor detection.

FIG. 9 is a flow diagram illustrating one example of furrow depth and compaction factor detection at block 468 shown in FIG. 5. At block 602, pre-harvest field data is received. In one example, block 602 is similar to block 420 discussed above with respect to FIG. 5.

At block 604, a first indication of furrow depth between first and second crop rows is generated. The harvester is controlled to harvest crop at block 606 and post-harvest field data is received at block 608. In one example, block 608 is similar to block 450 discussed above with respect to FIG. 5.

At block 610, a second indication of furrow depth is generated based on the post-harvest field data. The second indication of furrow depth is generated based on sensor data acquired after the furrow has been traversed by the harvesting machine. At block 612, a compaction factor and/or a machine roll angle can be determined based on the first and second indications of furrow depth. For example, differences in the furrow depth can indicate a level of compaction, such as a depth of compaction, a degree of compaction, caused by traversal of the machine through the furrow. Machine roll can be determined based on the furrow depth, such as based on the amount of compaction of the given furrow and/or comparing the depth of the furrow to another furrow on the opposite side of the machine.

The cutting height can be adjusted at block 614 based on the compaction and/or machine roll. For example, if it is determined that the machine has rolled to one side, the basecutter can be lifted on that side to prevent ground contact.

At block 616, a compaction map can be generated that maps compaction factors to the corresponding locations in the field. The compaction map can be stored at block 618 and/or output at block 620 to another system for use in a subsequent operation.

Figure 10:
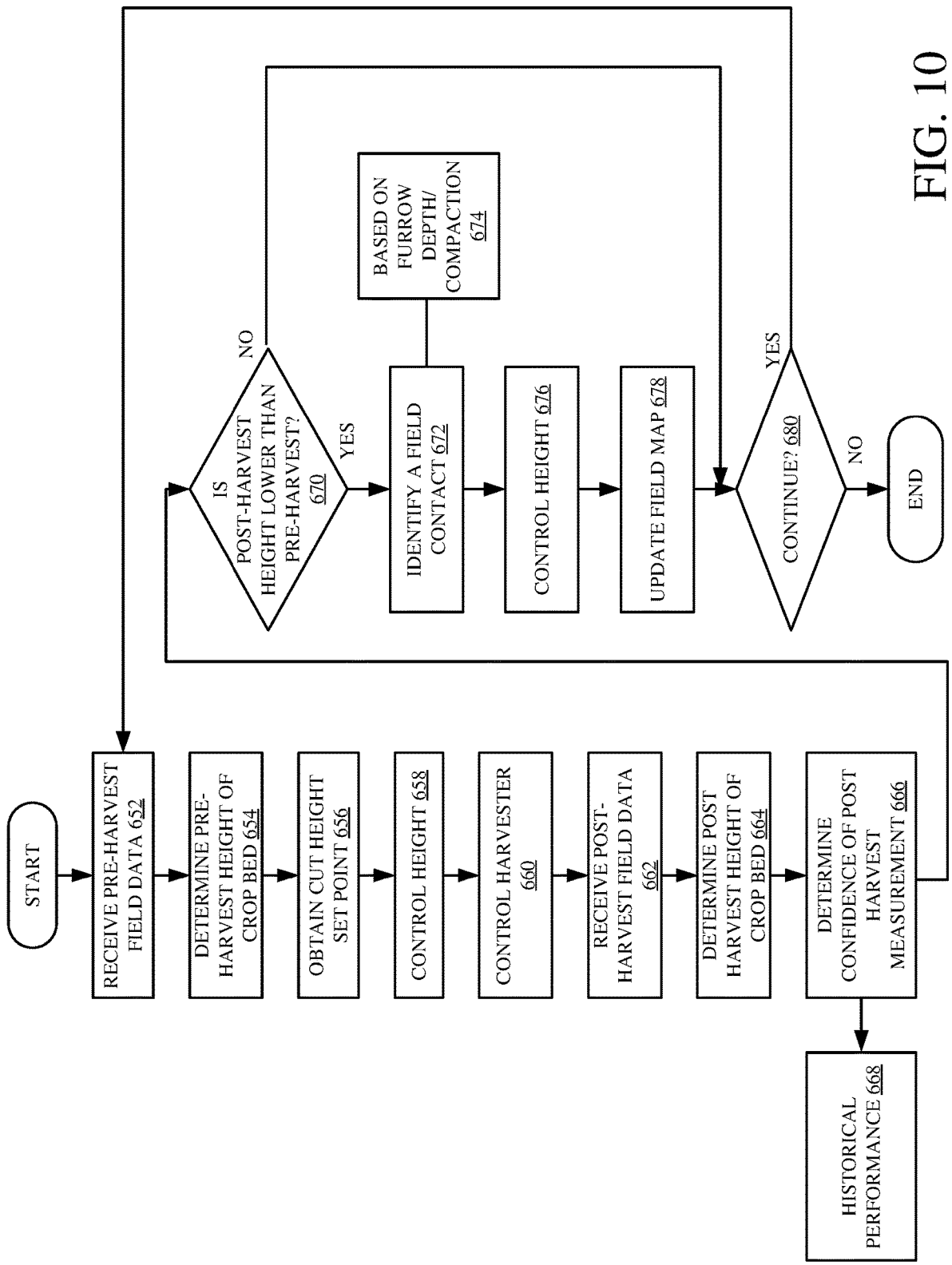
FIG. 10 is a flow diagram illustrating one example of detecting field contact by a harvesting device.

FIG. 10 is a flow diagram illustrating one example of detecting field contact by a harvesting device. At block 652, pre-harvest field data is received and, at block 654, a pre-harvest height of a crop bed is determined. At block 656, a cut height set point is obtained, and a height of the harvesting device is set at block 658. At block 660, the harvester is controlled to harvest the field and post-harvest field data is received at block 662. In one example, blocks 652, 654, 656, and 658 are similar to blocks 420, 428, 434, and 442, respectively, discussed above with respect to FIG. 5.

At block 664, a post-harvest height of the crop bed is determined. One example is discussed above with respect to block 454 in FIG. 5. At block 666, a confidence of the post-harvest measurement is determined. For example, the confidence determination can be based on historical performance data at block 668. Illustratively, the confidence indicates a degree to which post-harvest measurements are considered accurate.

At block 670, operation determines whether the post-harvest height indication indicates a lower height than the pre-harvest indication. If so, operation proceeds to block 672 where a field contact is identified, which indicates that the basecutter (or other cutting device) contacted the field and changed the ground height. In one example, a field contact is identified based on the confidence determined at block 666 exceeding a threshold. Alternatively, or in addition, the field contact can be identified based on detected furrow depth and/or compaction factors, as discussed above and illustrated at block 674.

At block 676, the cutter height is controlled to prevent further ground contact. At block 678, if a field map is utilized for the pre-harvest field data, the field map can be updated to reflect the ground contact. If the process continues at block 680, operation returns to block 652.

Figure 11:
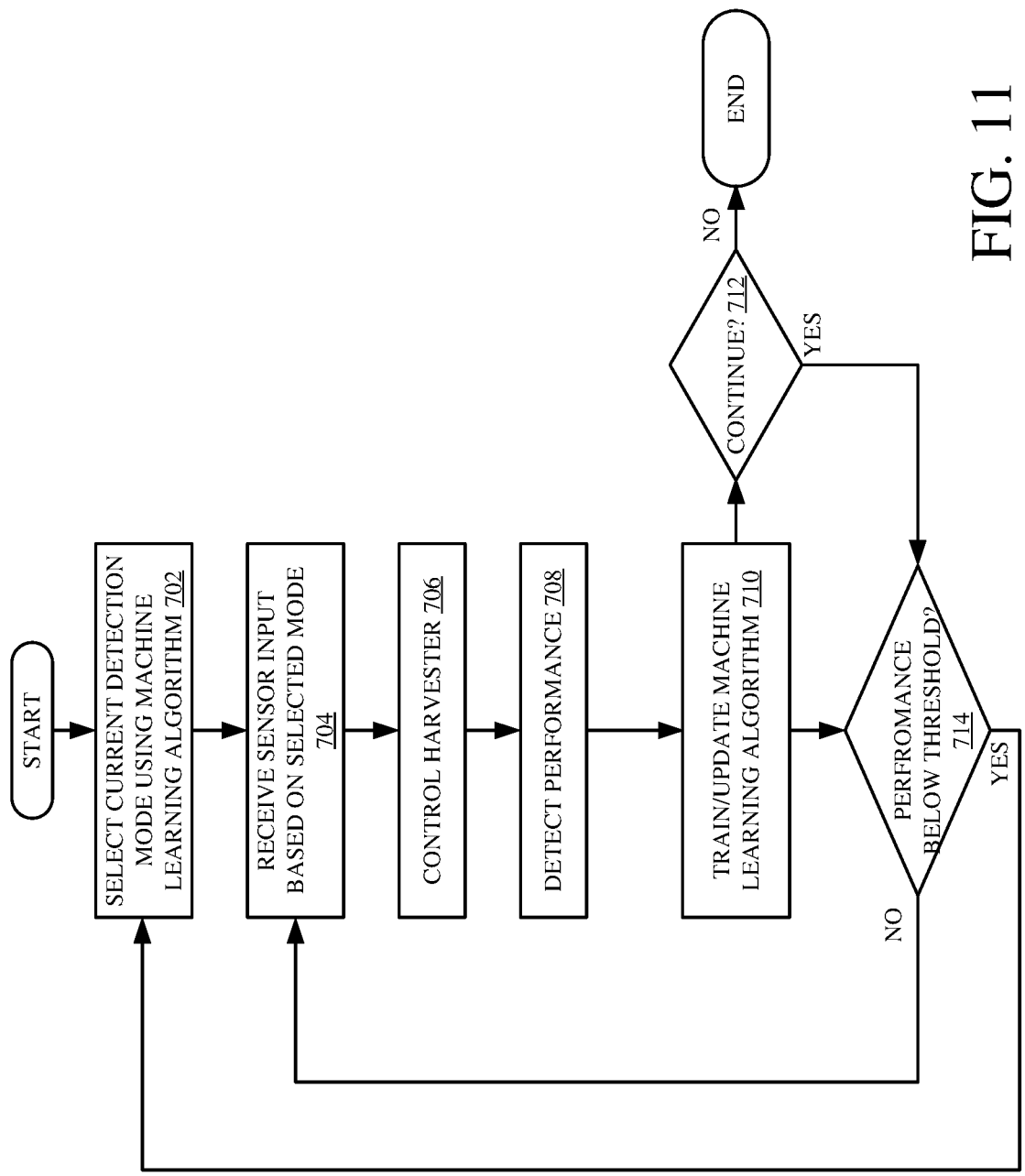
FIG. 11 is a flow diagram illustrating one example of detection mode selection.

FIG. 11 is a flow diagram illustrating one example of mode selection at block 404 shown in FIG. 5. At block 702, a current detection mode is selected using a machine learning algorithm. Sensor input is received at block 704 based on the selected mode. For example, if a predictive detection mode is selected, then predicted crop heights can be obtained. Alternatively, if pre-harvest in-situ sensing is selected, field data can be obtained from in-situ sensors on harvesting machine 102.

At block 706, the harvesting machine is controlled to harvest the field and performance is detected at block 708. The performance can indicate a degree to which the desired cutting height has been achieved, or any other performance metrics that are desired. For instance, productivity, quality, etc. can be generated as performance metrics.

At block 710, the machine learning algorithm is trained or updated, and if the process continues at block 712, operation proceeds to block 714 in which the detected performance is compared to a threshold. If the performance is not below the threshold, operation returns to block 704 in which additional sensor data is obtained and the machine learning algorithm can be further trained. If the performance is below the threshold, operation returns to block 702 in which a different detection mode can be selected to improve performance.

It can thus be seen that the present features provide a system for cutter height detection and control that improves harvester performance. The system utilizes post-harvest in-situ data to identify post-harvest field topology and/or crop stubble height which is used to control cutter height in subsequent areas. For example, a pre-harvest field sensor can be calibrated based on the post-harvest in-situ data. The system can reduce the likelihood of ground contacts and/or increase yield through increased cutter height accuracy.

The present discussion has mentioned processors and servers. In one example, the processors and servers include computer processors with associated memory and timing circuitry, not separately shown. The processors and servers are functional parts of the systems or devices to which the processors and servers belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 12:
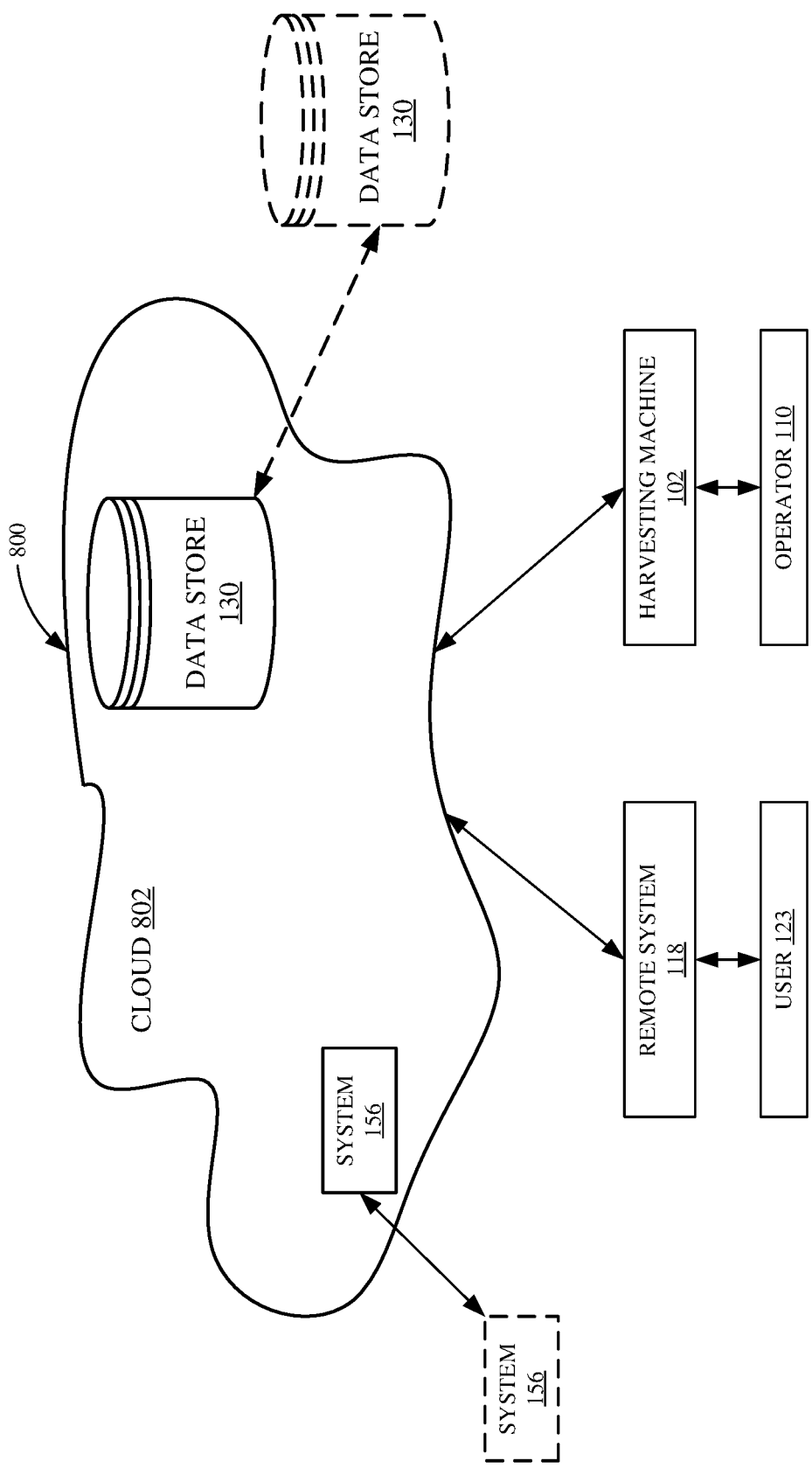
FIG. 12 is a block diagram showing one example of the architecture illustrated in FIG. 1, deployed in a remote server architecture.

FIG. 12 is a block diagram of one example of harvesting machine architecture 100, shown in FIG. 1, where machine 102 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in previous FIGS. as well as the corresponding data, can be stored on servers at a remote location. The computing resources in a remote server environment can be consolidated at a remote data center location or the computing resources can be dispersed. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 12, some items are similar to those shown in previous figures and the items are similarly numbered. FIG. 12 specifically shows system 156 from previous FIGS. can be located at a remote server location 802. Therefore, machine 102, machine 116, and/or system 118 can access those systems through remote server location 802.

FIG. 12 also depicts another example of a remote server architecture. FIG. 12 shows that it is also contemplated that some elements of previous FIGS. are disposed at remote server location 802 while others are not. By way of example, one or more of data store 130 and system 156 can be disposed at a location separate from location 802, and accessed through the remote server at location 802. Regardless of where the systems and data stores are located, the systems and data stores can be accessed directly by machines 102 and/or 116 through a network (either a wide area network or a local area network), the systems and data stores can be hosted at a remote site by a service, or the systems and data stores can be provided as a service, or accessed by a connection service that resides in a remote location. All of these architectures are contemplated herein.

It will also be noted that the elements of the FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
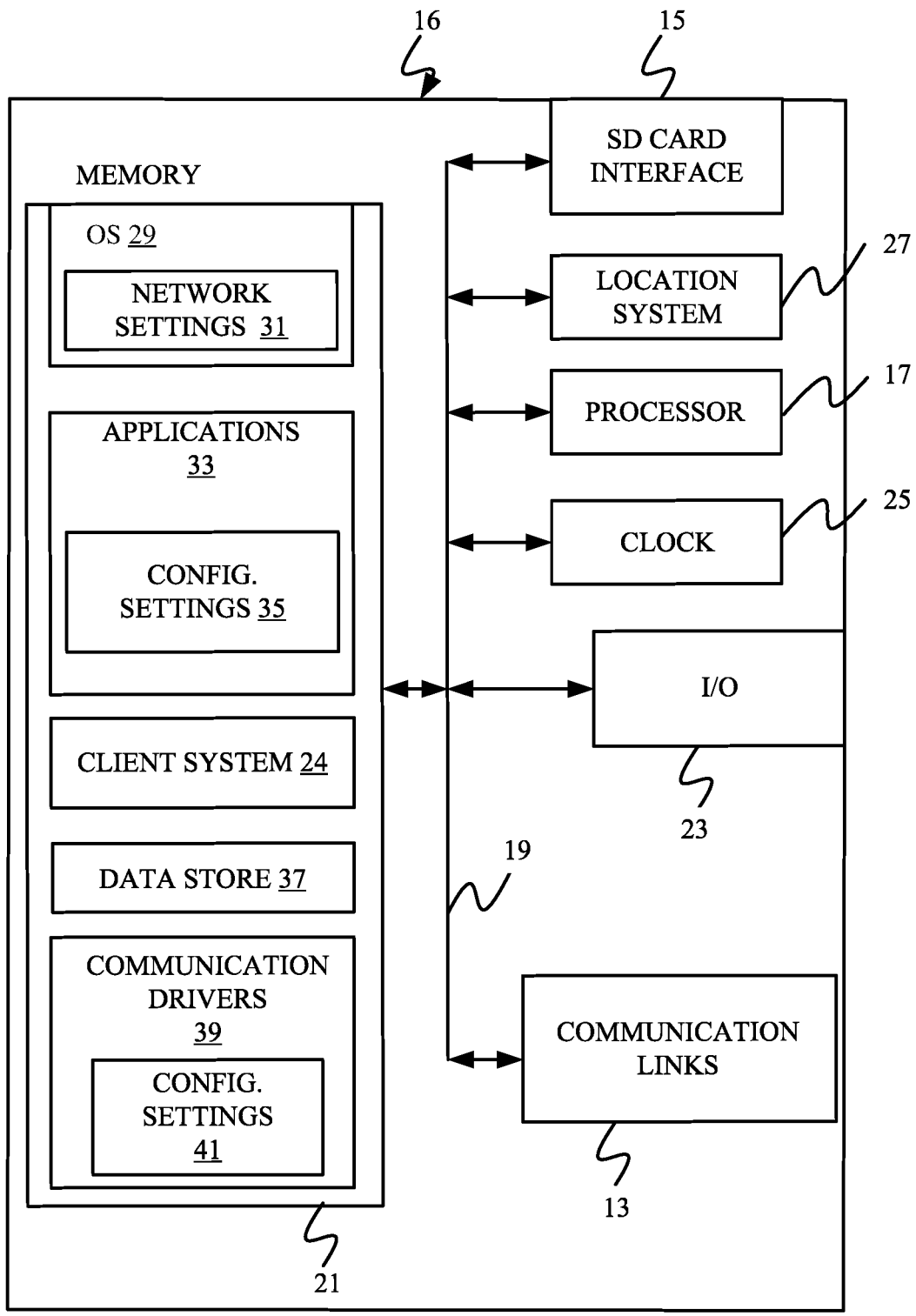
FIGS. 13-15 show examples of mobile devices that can be used in the architectures shown in the previous figures.

FIG. 13 is a simplified block diagram of one illustrative example of a handheld or mobile computing device that can be used as a user's or client's handheld device 16, in which the present system (or parts of the present system) can be deployed. For instance, a mobile device can be deployed in the operator compartment of machine 102 for use in generating, processing, or displaying machine speed and performance metric data. FIGS. 11-12 are examples of handheld or mobile devices.

FIG. 13 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively includes a real time clock component that outputs a time and date. Clock 25 can also, illustratively, provide timing functions for processor 17.

Location system 27 illustratively includes a component that outputs a current geographic location of device 16. Location system 27 can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 14:
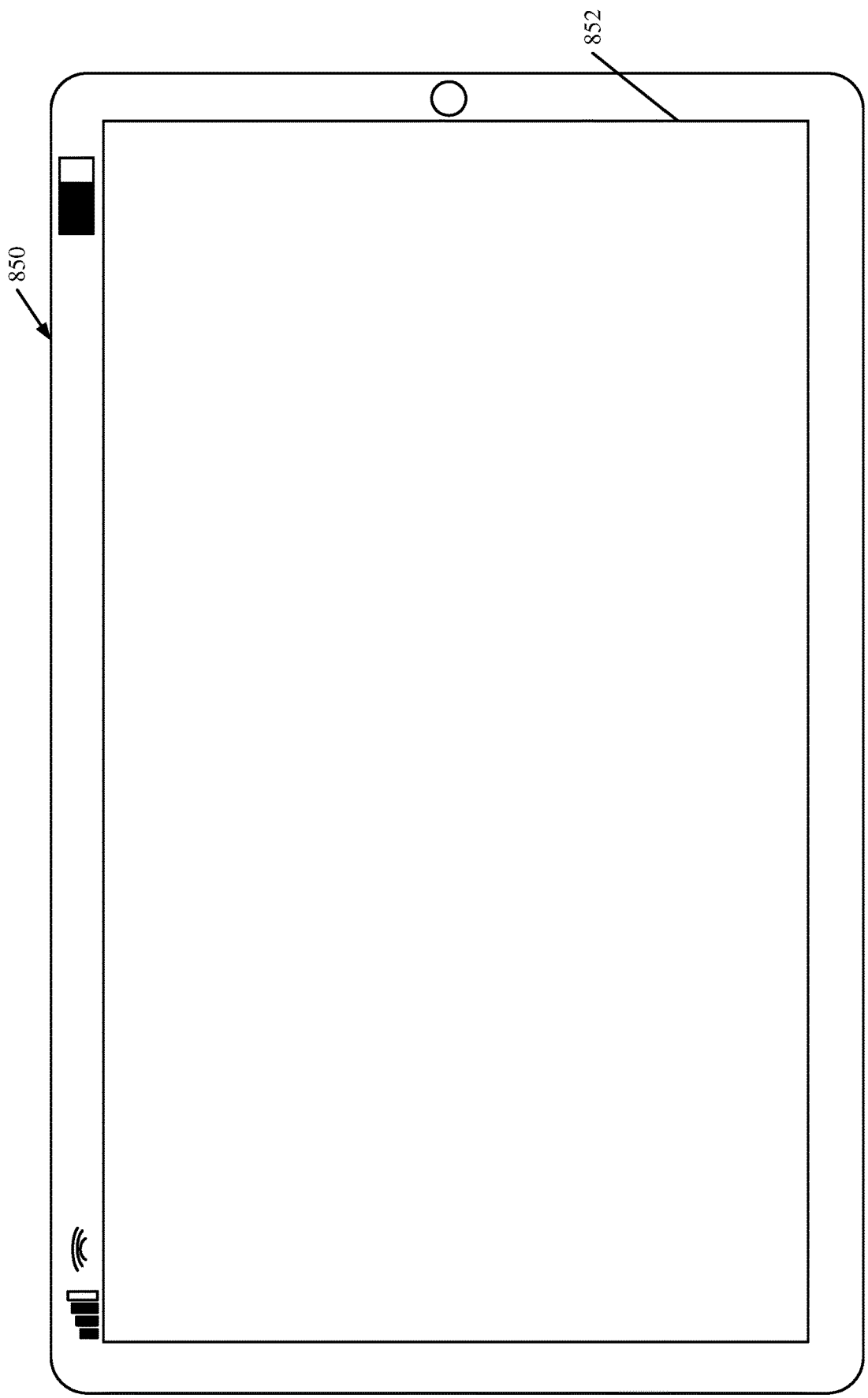

FIG. 14 shows one example in which device 16 is a tablet computer 850. In FIG. 14, computer 850 is shown with user interface display screen 852. Screen 852 can be a touch screen or a pen-enabled interface that receives inputs from a pen or stylus. Screen 852 can also use an on-screen virtual keyboard. Of course, screen 852 might also be attached to a keyboard or other user input device through a suitable attachment mechanism, such as a wireless link or USB port, for instance. Computer 850 can also illustratively receive voice inputs as well.

Figure 15:
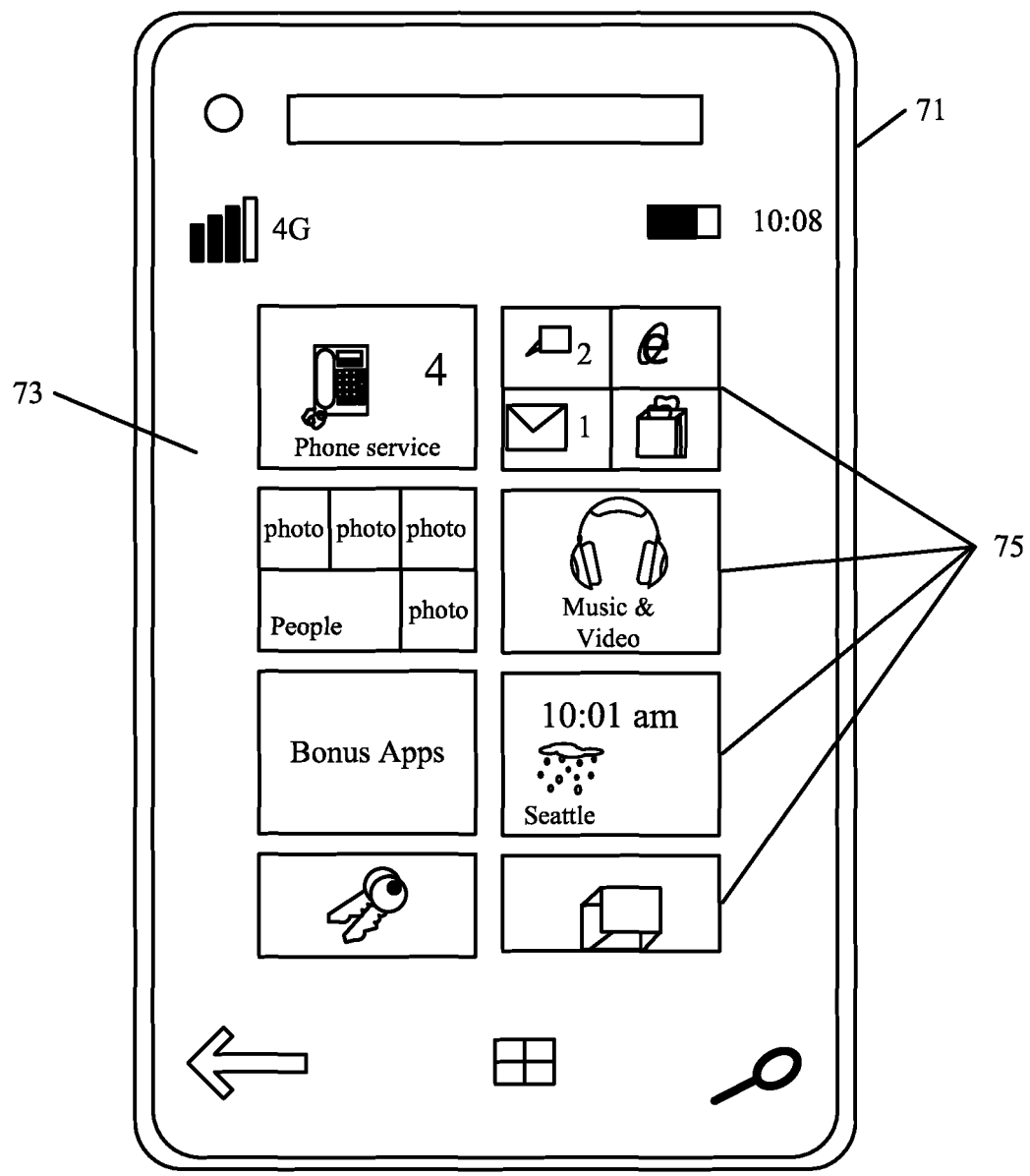

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
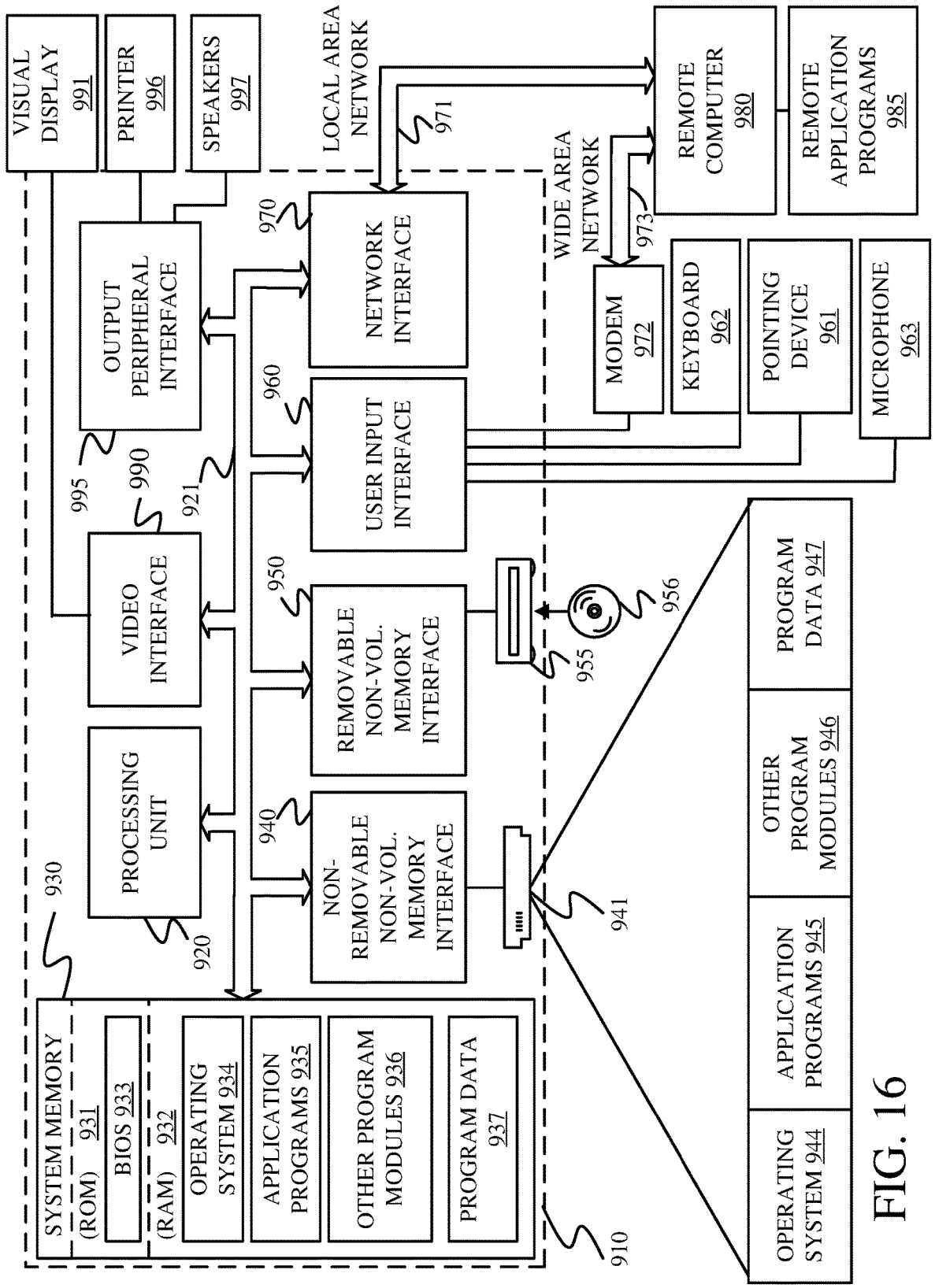
FIG. 16 is a block diagram showing one example of a computing environment that can be used in the architectures shown in the previous figures.

FIG. 16 is one example of a computing environment in which elements of previous FIGS., or parts of them, (for example) can be deployed. With reference to FIG. 16, an example system for implementing some embodiments includes a general-purpose computing device in the form of a computer 910 programmed to operate as discussed above. Components of computer 910 may include, but are not limited to, a processing unit 920 (which can include processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to previous FIGS. can be deployed in corresponding portions of FIG. 16.

Computer 910 typically includes a variety of computer readable media. Computer readable media can be any available media that can be accessed by computer 910 and includes both volatile and nonvolatile media, removable and non-removable media. By way of example, and not limitation, computer readable media may include computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 16 illustrates operating system 934, application programs 935, other program modules 936, and program data 937.

The computer 910 may also include other removable/non-removable volatile/nonvolatile computer storage media. By way of example only, FIG. 16 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware components. For example, and without limitation, illustrative types of hardware components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 910. In FIG. 16, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 16 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling an agricultural harvesting machine having a controllable subsystem configured to cut crop on a field, the method comprising:
   receiving a pre-harvest indication of topography of a ground surface in a first area of the field prior to the first area being harvested;
   controlling a position of the controllable subsystem to cut the crop in the first area based on the pre-harvest indication of topography of the ground surface in the first area;
   receiving in-situ data from the first area of the field after the first area is harvested by the controllable subsystem;
   receiving a pre-harvest indication of topography of the ground surface in a second area of the field prior to the second area being harvested;
   controlling the position of the controllable subsystem to cut the crop in the second area based on the in-situ data and the pre-harvest indication of topography of the ground surface in the second area,
   detecting a first depth of a furrow between a first crop row and a second crop row prior to the first crop row being harvested by the agricultural harvesting machine;
   detecting a second depth of the furrow after the first crop row is harvested by the agricultural harvesting machine;
   generating a compaction factor based on the first depth and the second depth; and
   controlling the agricultural harvesting machine based on the compaction factor.

2. The method of claim 1, wherein the controllable subsystem comprises a header, and further comprising:

determining a height of a crop bed in the first area based on the pre-harvest indication of topography of the ground surface in the first area; and
setting a cutting height of the header based on the height of the crop bed.

3. The method of claim 2, wherein the receiving the pre-harvest indication of topography of the ground surface in the first area comprises:
receiving, from a first sensor on the agricultural harvesting machine, a first sensor signal indicative of a distance from the first sensor to the crop bed.

4. The method of claim 3, wherein receiving the in-situ data comprises receiving a second sensor signal from a second sensor on the agricultural harvesting machine.

5. The method of claim 4, wherein each sensor of the first sensor and the second sensor comprises at least one of:
a radio detection and ranging (RADAR) sensor;
an ultrasonic sensor; or
an imaging sensor.

6. The method of claim 4, wherein the second sensor signal is indicative of a crop stubble height in the first area, and the method further comprises:
determining that the crop stubble height is above a threshold; and
adjusting the cutting height of the header based on the determination.

7. The method of claim 4, wherein the second sensor signal is indicative of a distance from the second sensor to the crop bed.

8. The method of claim 7, and further comprising:
determining that the header contacted the ground surface in the first area based on the first sensor signal and the second sensor signal; and
controlling the position based on the determination.

9. The method of claim 4, and further comprising:
adjusting the cutting height of the header based on the second sensor signal.

10. The method of claim 4, and further comprising:
calibrating the first sensor based on the second sensor signal.

11. The method of claim 1, wherein
the first area of the field comprises the first crop row of a plurality of crop rows in the field,
the second area of the field comprises the second crop row, of the plurality of crop rows, that is adjacent to the first crop row, and
the method further comprises:
generating, based on the in-situ data, a predicted crop bed height in the second crop row; and
controlling the position of the controllable subsystem to cut the crop in the second crop row based on the predicted crop bed height and the pre-harvest indication of topography of the ground surface in the second crop row.

12. The method of claim 1, and further comprising:
detecting furrow depth between the first crop row and the second crop row based on the topography of the ground surface in the first area; and
based on the furrow depth, controlling a height of a crop collecting and gathering device of the agricultural harvesting machine.

13. The method of claim 1, wherein controlling the agricultural harvesting machine based on the compaction factor comprises at least one of:
controlling a position of a harvesting device of the agricultural harvesting machine; or
generating a compaction map.

14. An agricultural harvesting machine comprising:
a controllable subsystem configured to cut crop on a field; and
a control system configured to:
receive a pre-harvest indication of topography of a ground surface in a first area of the field prior to the first area being harvested;
control a position of the controllable subsystem to cut the crop in the first area based on the pre-harvest indication of topography of the ground surface in the first area;
receive in-situ data from the first area of the field after the first area is harvested by the controllable subsystem;
receive a pre-harvest indication of topography of the ground surface in a second area of the field prior to the second area being harvested;
control the position of the controllable subsystem to cut the crop in the second area based on the in-situ data and the pre-harvest indication of topography of the ground surface in the second area;
detect a first depth of a furrow between a first crop row and a second crop row prior to the first crop row being harvested by the agricultural harvesting machine;
detect a second depth of the furrow after the first crop row is harvested by the agricultural harvesting machine;
generate a compaction factor based on the first depth and the second depth; and
control the agricultural harvesting machine based on the compaction factor.

15. The agricultural harvesting machine of claim 14, wherein the controllable subsystem comprises a header, and the control system is configured to:
determine a height of a crop bed in the first area based on the pre-harvest indication of topography of the ground surface in the first area; and
set a cutting height of the header based on the height of the crop bed.

16. The agricultural harvesting machine of claim 15, wherein the pre-harvest indication of topography of the ground surface in the first area is received from a first sensor on the agricultural harvesting machine and indicative of a distance from the first sensor to the crop bed.

17. The agricultural harvesting machine of claim 14, wherein the controllable subsystem comprises a header, and the control of the agricultural harvesting machine based on the compaction factor comprises at least one of:
control of a position of the header of the agricultural harvesting machine; or
generation of a compaction map.

18. A control system for an agricultural harvesting machine, the control system comprising:
at least one processor; and
memory storing instructions executable by the at least one processor, wherein the instructions, when executed, cause the control system to:
receive a pre-harvest indication of topography of a ground surface in a first area of a field prior to the first area being harvested;
control a position of a controllable subsystem of the agricultural harvesting machine to cut crop in the first area based on the pre-harvest indication of topography of the ground surface in the first area;

receive in-situ data from the first area of the field after the first area is harvested by the controllable subsystem;
receive a pre-harvest indication of topography of the ground surface in a second area of the field prior to the second area being harvested;
control the position of the controllable subsystem to cut the crop in the second area based on the in-situ data and the pre-harvest indication of topography of the ground surface in the second area;
detect a first depth of a furrow between a first crop row and a second crop row prior to the first crop row being harvested by the agricultural harvesting machine;
detect a second depth of the furrow after the first crop row is harvested by the agricultural harvesting machine;
generate a compaction factor based on the first depth and the second depth; and
control the agricultural harvesting machine based on the compaction factor.

19. The control system of claim 18, wherein the controllable subsystem comprises a header, and the instructions, when executed, cause the control system to:
determine a height of a crop bed in the first area based on the pre-harvest indication of topography of the ground surface in the first area; and
set a cutting height of the header based on the height of the crop bed.

20. The control system of claim 18, wherein the controllable subsystem comprises a header, and the control of the agricultural harvesting machine based on the compaction factor comprises at least one of:
control of a position of the header of the agricultural harvesting machine; or
generation of a compaction map.

* * * * *